(12) United States Patent
Schwedt et al.

(10) Patent No.: US 11,921,274 B2
(45) Date of Patent: Mar. 5, 2024

(54) METHOD FOR DETECTING EMISSION LIGHT, DETECTION DEVICE AND LASER SCANNING MICROSCOPE

(71) Applicant: Carl Zeiss Microscopy GmbH, Jena (DE)

(72) Inventors: Daniel Schwedt, Jena (DE); Tiemo Anhut, Jena (DE); Peter Schacht, Erfurt (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 18/018,331

(22) PCT Filed: Jul. 29, 2021

(86) PCT No.: PCT/EP2021/071269
§ 371 (c)(1),
(2) Date: Jan. 27, 2023

(87) PCT Pub. No.: WO2022/023474
PCT Pub. Date: Feb. 3, 2022

(65) Prior Publication Data
US 2023/0258916 A1    Aug. 17, 2023

(30) Foreign Application Priority Data

Jul. 30, 2020 (DE) .................... 10 2020 120 190.7

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G02B 21/0032* (2013.01); *G02B 21/008* (2013.01)

(58) Field of Classification Search
CPC ............ G02B 21/0076; G02B 21/0032; G02B 21/008; G01N 21/6458
See application file for complete search history.

(56) References Cited

U.S. PATENT DOCUMENTS

| 7,280,203 B2 * | 10/2007 | Olschewski ....... G02B 21/0076 250/459.1 |
| 2004/0129858 A1 * | 7/2004 | Czarnetzki ............... G02B 7/34 250/201.3 |

(Continued)

FOREIGN PATENT DOCUMENTS

| DE | 102014111167 A1 | 2/2016 |
| DE | 102017113683 A1 | 12/2018 |

OTHER PUBLICATIONS

Castello et al., "Image Scanning Microscopy with Single-Photon Detector Array", bioRxiv, Jun. 2, 2018, doi: http://dx.doi.org/10.1101/335596, 21 pages.

(Continued)

*Primary Examiner* — Mustak Choudhury
(74) *Attorney, Agent, or Firm* — LaBatt, LLC

(57) ABSTRACT

Detecting emission light, in a laser scanning microscope, wherein the emission light emanating from a sample is guided onto a two-dimensional matrix sensor having a plurality of pixels and being located on an image plane, and a detection point distribution function is detected by the matrix sensor in a spatially oversam pled manner. The emission light emanating from the sample is spectrally separated in a dispersion device; the spectrally separated emission light is detected by the matrix sensor in a spectrally resolved manner; and during the analysis of the intensities measured by the pixels of a pixel region, the spectral separation is cancelled at least for some of said pixels. Additional aspects relate to a detection device for the (Continued)

a)

b)

Figure 1:
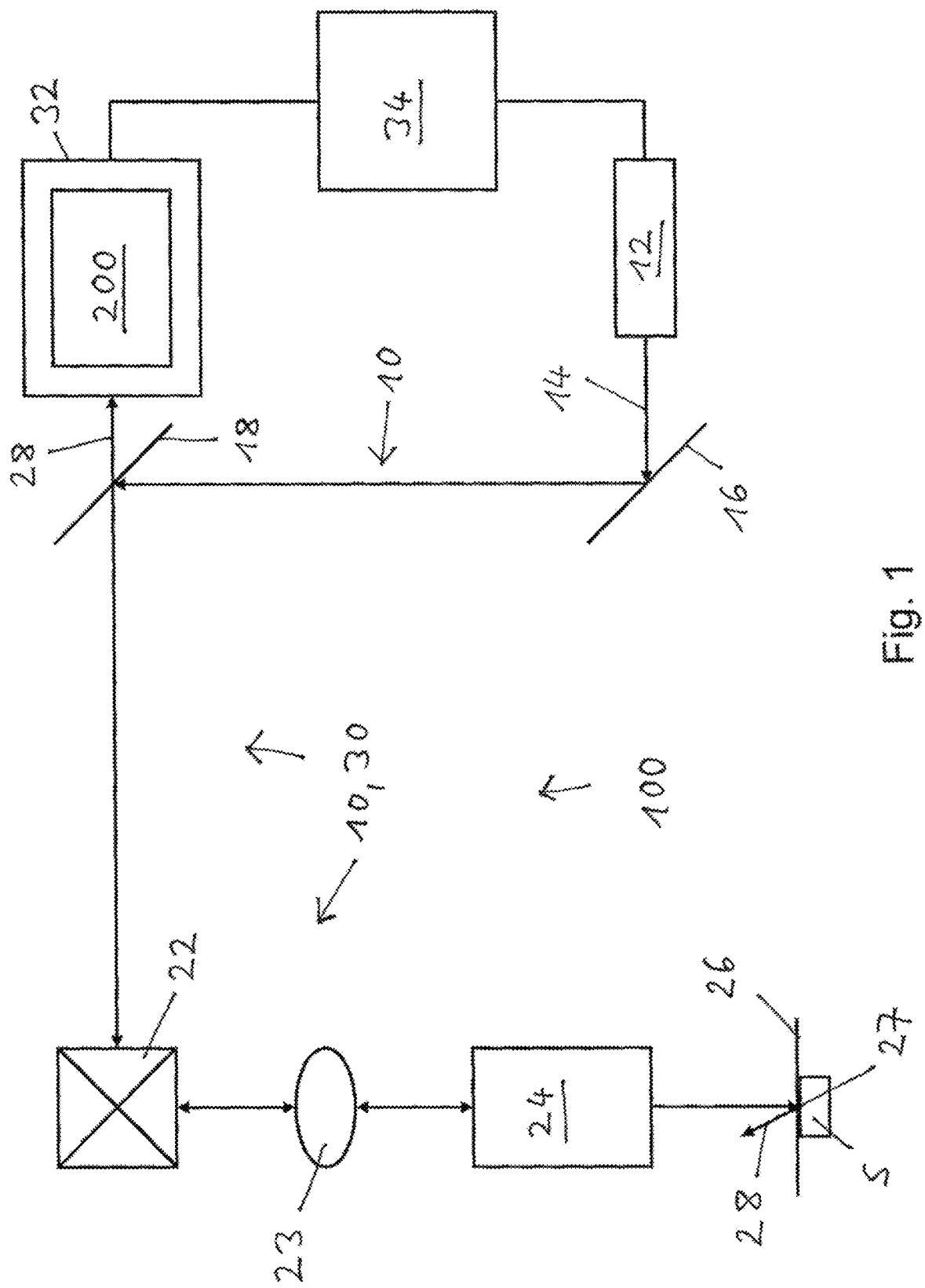

spectrally resolved detection of emission light in a laser scanning microscope and to a laser scanning microscope.

29 Claims, 10 Drawing Sheets

(56) References Cited

U.S. PATENT DOCUMENTS

| | | |
|---|---|---|
| 2014/0361154 A1 | 12/2014 | Hayashi |
| 2017/0227749 A1 | 8/2017 | Kleppe et al. |
| 2019/0258041 A1 | 8/2019 | Anhut et al. |
| 2020/0003551 A1 | 2/2020 | Sirat |
| 2020/0116987 A1 | 4/2020 | Kleppe et al. |
| 2020/0386974 A1* | 12/2020 | Vicidomini ........ G02B 21/0028 |

OTHER PUBLICATIONS

Huff et al., "The Airyscan Detecor from ZEISS Confocal Imaging with Improved Signal-to-Noise Ratio and Superresolution", Carl Zeiss Microscopy GmbH—Technology Note, Jul. 1, 2015, http://www.gattaquant.com/files/en_wp_airyscan-detector.pdf, 10 pages.
Castello et al., "A robust and versatile platform for image scanning microscopy enabling super-resolution FLIM", Nat Methods 16, 175-178 (2019). https://doi.org/10.1038/s41592-018-0291-9, 6 pages.
Strasser et al., "Spectral image scanning microscopy", Biomedical Optics Express 2513, vol. 10, No. 5, May 1, 2019, 15 pages.
International Search Report and Written Opinion for PCT/EP2021/071269, dated Oct. 27, 2021, 20 pages with English translation.
Search Report for German Application No. 10 2020 120 190.7, dated Apr. 19, 2021, 11 pages (no English translation available).

* cited by examiner

METHOD FOR DETECTING EMISSION LIGHT, DETECTION DEVICE AND LASER SCANNING MICROSCOPE

In a first aspect, the present invention relates to a method for detecting emission light, in particular fluorescence light from at least one fluorescent dye, in a laser scanning microscope according to the preamble of claim 1. In further aspects, the invention relates to a detection apparatus for detecting emission light in a laser scanning microscope according to the preamble of claim 16 and to a laser scanning microscope according to the preamble of claim 27.

A generic method for detecting emission light, in particular fluorescence light from at least one fluorescent dye, in a laser scanning microscope is disclosed, for example, in M. Castello et al., "Image Scanning Microscopy with Single-Photon Detector Array", bioRxiv, doi: http://dx.doi.org/10.1101/335596 (Hereafter: [Castello et al. 2019]). In the process, emission light coming from a sample is guided by way of an imaging optical unit to a two-dimensional matrix sensor that is situated in an image plane and has a multiplicity of pixels, and a detection point spread function is detected in spatially oversampled fashion using the matrix sensor.

A generic detection apparatus for detecting emission light in a laser scanning microscope is likewise disclosed in [Castello et al. 2019]. A generic detection apparatus comprises a two-dimensional matrix sensor in an image plane with a multiplicity of pixels for spatially oversampled detection of a detection point spread function of emission light coming from a sample and comprises an imaging optical unit for guiding the emission light to the two-dimensional matrix sensor.

A generic laser scanning microscope is likewise described in [Castello et al. 2019] and comprises the following components: a light source, in particular a laser, for emitting excitation light; an excitation beam path with a microscope objective for guiding the excitation light onto or into a sample to be examined; a scanning device which is located in the excitation beam path and serves to scan at least one illumination spot over the sample; a detection beam path for guiding emission light emitted by the sample, in particular fluorescence light, to a detection unit; a main color splitter for separating excitation light and emission light; the detection unit for detecting the emission light; and a control and evaluation unit, in particular a PC, for controlling the light source and for evaluating measurement data obtained by the detection unit.

In biomedical research, confocal laser scanning microscopes (LSM) have become established as powerful tools in recent decades because, in addition to pure imaging of fluorescing biological samples, they also support many image-based, correlative or statistical experiments and analyses. A major reason for this power lies in the fact that the LSM allows the simultaneous measurement of a plurality of dyes with a moderate equipment outlay. Many solutions are known in this respect. By way of example, dichroic filters can bring about a split into different partial beams, and these can then each be guided to a photon multiplier (Photomultiplier Tube—PMT) as a sensor. By contrast, arrangements that spectrally disperse the emission light using a grating or prism in order to then detect the spectrum using a line sensor are much more flexible. Unwanted spectral ranges can be blocked in flexible and dye-dependent fashion using movable stops upstream of the sensor. Moreover, solutions are also known in which spectral bands are defined using mirrored stops, for example, and the said spectral bands are then fed to different PMTs. Both here and below, the term dye is intended to comprise both synthetic dyes and fluorescent proteins. Furthermore, intrinsically emitting structures are also intended to be comprised. By way of example, many biological structures emit light under laser irradiation at a specific wavelength, which is then referred to as autofluorescence, for example.

An innovation in confocal microscope systems, which was theoretically described approx. 30 years ago but was not commercialized until 2014 with the LSM880 by ZEISS, is image scanning microscopy (ISM, http://www.gattaquant-.com/files/en_wp_airyscan-detector.pdf). It is based on an oversampled measurement of the detection point spread function using a camera-like sensor and, firstly, allows the confocal resolution limit to be attained despite the open pinhole and, secondly, noticeably increases the sensitivity of the system due to the inherent parallelization of the detection. However, the solution currently implemented in the LSM980 is firstly very expensive since fiber-based image conversion (from 2D to 1 D) is combined with a GaAsP PMT line. Secondly, this severely limits the number of pixels that can be used to oversample the point spread function (PSF). In this specific case, it is exactly 32 pixels. Therefore, these sensors can only be used advantageously in arrangements in which spectral channels are defined by means of dichroic filters and in which an optical zoom is also required, the latter being used to guide the PSF, which depends on both the selected objective (more precisely, the etendue and hence the ratio of NA/M) and the wavelength, to the sensor. Moreover, the unit costs of this detector technology hardly allow the installation of more than one detector per piece of equipment.

On the sensor side, there has been rapid development in the field of so-called SPAD arrays or SPAD cameras (SPAD=Single-photon avalanche diode) in recent years. In principle, these cameras allow an individual activation of the pixels, with one pixel here being implemented by a single-photon avalanche diode. Moreover, the pixels can be operated in the so-called Geiger mode, and so photon counting is possible on an area sensor. Hence, the read signal is immediately digital, which enables extremely high frame rates of the order of 1 MHz. Moreover, SPAD cameras have no readout noise. Readout noise occurs especially in other sensors such as sCMOS sensors or CCDs and increases significantly with a high readout rate. EM-CCDs use an amplification mechanism close to the sensor to raise the signal above the readout noise and can therefore, in principle, become single-photon sensitive. However, this introduces significant amplifier noise (also referred to as excess noise; multiplication noise), which halves the effective sensitivity of the sensor. Moreover, the achievable speeds are fundamentally limited in the case of a relatively large number of pixels. sCMOS cameras achieve low readout noise of the order of 0.3e-, which, in principle, allows photon counting using these cameras.

With frame rates in the MHz range, SPAD cameras are already of interest as sensors for LSMs whose pixel dwell times are of the order of 1 µs. By way of example, 156 kfps (fps=frames per second) with a sensor resolution of 512×128 pixels at 1 bit data depth have been obtained using such a camera. This corresponds to a data rate of around 10 Gbit. This means that line sensors with approx. 1000×6 pixels should be possible, even with a frame rate of 1 Mfps at 1 bit data depth. As yet, the limitations are not a fundamental limit, but rather determined technically by the enormous data rates. With a data depth of just one bit, speeds are achievable that roughly correspond to the inverse of the dead time and are therefore of the order of 10 MHz. For the example above, however, this would correspond to a data rate of 100 Gbit/s.

An object of the invention can be considered to be that of providing a method of the type set forth at the outset, which can be used in a particularly versatile manner. Moreover, the intention is to specify a suitable detection apparatus and a laser scanning microscope.

This object is achieved by the method having the features of claim 1, by the detection apparatus having the features of claim 13, and by the laser scanning microscope having the features of claim 23.

Advantageous variants of the method according to the invention and preferred exemplary embodiments of the detection apparatus according to the invention and microscope according to the invention are explained below, particularly in association with the dependent claims and the figures.

The method of the type specified above is further developed according to the invention in that the emission light coming from the sample is spectrally decomposed, in particular in a dispersion direction, using a dispersion device; in that the spectrally decomposed emission light is detected in spectrally resolved fashion using the matrix sensor; and in that the evaluation of the intensities measured by the pixels of a pixel region includes the reversal of the spectral separation for at least some of these pixels.

The detection apparatus of the type specified above is further developed according to the invention in that a dispersion device is present for the spectral separation of the emission light; in that the matrix sensor is configured and positioned for the spectrally resolved detection of the spectrally separated detection light; and in that evaluation electronics connected to the matrix sensor are present and are configured, within the scope of evaluating the intensities measured by the pixels of a pixel region, to reverse the spectral separation for these pixels.

The laser scanning microscope of the type specified above is further developed according to the invention in that the detection unit comprises a detection apparatus according to the invention.

The fact that the emission light coming from the sample is spectrally separated so that the spectral components of different fluorescent dyes are in principle initially incident on different, that is to say spatially separate, regions of the matrix sensor can be considered to be an essential idea of the invention. These regions are identified and each assigned to a fluorescent dye. The spectral separation is then reversed by calculation at least for some of the pixels in the respective regions, and so a point spread function can be determined for the individual fluorescent dyes, in principle like in the case of the known ISM. The respective point spread functions can therefore be measured for different fluorescent dyes. In any case, the spectral separation is advantageously carried out for those pixels where a significant intensity is measured.

An essential advantage of the present invention can be considered to be that both the advantages of spectral flexibility and the effects with regard to resolution and sensitivity achieved by oversampling the point spread function can be obtained.

The method according to the invention, the detection apparatus according to the invention, and the microscope according to the invention therefore also enable ISM with a spectrally dispersed signal distribution. Moreover, the detection apparatus according to the invention and the microscope according to the invention are distinguished in that a particularly high light efficiency and overall stable arrangements can be achieved.

The detection apparatus according to the invention is suitable, in particular, for carrying out the method according to the invention.

The term detection point spread function means that intensity distribution on the detector which is generated by a punctiform luminous object in the sample plane.

In principle, the pixel regions associated with different dyes can also overlap on the detector. It is important that there is at least a certain spatial separation of the pixel regions.

It is clear that the evaluation is easier and better, the more clearly the pixel regions are separated or the more the spectral signatures of the respective dyes differ.

The laser scanning microscope according to the invention and in particular the control and evaluation unit can be configured together with the detection apparatus to carry out the method according to the invention.

A few examples of how the computational reversal of the spectral separation can be carried out are explained below.

In a particularly preferred variant of the method, at least one pixel region which is assigned to the emission of a dye is identified on the basis of a spectrum measured using the matrix sensor.

Advantageously, a spectral intensity distribution of the emission light on the matrix sensor is initially determined. The pixel regions, for example, can then be identified on the basis of this intensity distribution. Moreover, the intensity distribution can be used for the computational reversal of the spectral separation. In a particularly preferred variant of the method according to the invention, an intensity value associated with a specific wavelength is determined for the determination of a spectral intensity distribution of the emission light on the matrix sensor by virtue of the measurement data of a plurality of pixels in a column of the matrix sensor, in particular the measurement data of all pixels in a column of the matrix sensor, perpendicular to the dispersion direction being summed.

This data relating to the spectral intensity distribution of the emission light can be redetermined automatically, for example after a change in the measurement environment. A change in the measurement environment is primarily considered to be a change in the sample to be examined, optionally also in the examined sample location, which samples or sample locations may have optionally been prepared with different dyes.

Supplementarily or in addition, provision can be made for the data relating to the spectral distribution to be determined continuously and, in particular, automatically from a number, to be determined, of preceding measurements, in particular immediately preceding measurements. This variant is advantageous in that a separate initiation of a recording of the data is not required.

It is understood that a plurality of measurement data are added for all the evaluations described here, in order to achieve a better signal-to-noise ratio. Where necessary, the number of measurements over which an average is taken to obtain the desired data may differ.

In a further preferred variant of the method according to the invention, maxima and minima are then automatically searched for in the determined spectral distribution in order to identify the pixel regions and spectral limits for calculating the point spread function of a specific dye can be proposed to a user on the basis of maxima and minima that have been found. Alternatively, spectral limits can also be automatically defined on the basis of the maxima and minima that have been found. Accordingly, the control and evaluation unit in the microscope according to the invention can be configured to search for maxima and minima in a determined spectral distribution and to propose spectral limits for calculating the point spread function of a specific dye on the basis of maxima and minima that have been found. Alternatively, the control and evaluation unit can be configured to independently define spectral limits for calculating the point spread function of a specific dye on the basis of maxima and minima that have been found.

Samples with spectrally overlapping dyes or fluorescent proteins can also be imaged and measured using the method according to the invention and the microscope according to the invention.

In a preferred variant of the method according to the invention, the pixel regions overlap on the matrix detector and a spectral unmixing of the intensities measured by the individual pixels is carried out. Methods for spectral unmixing are known in principle.

In addition to the methods for reversing the spectral split described herein, such a method for spectral unmixing would then be carried out before or after the reversal of the spectral split.

By way of example, the reversal of the dispersion can initially be carried out for a freely chosen number of spectral bands—typically two regions with pure emissions and one region with overlapping emission in the case of two dyes—and this can be followed by the application of image scanning microscopy and then the unmixing of the—in this example three—channels.

The relative proportions of specific spectral components in a pixel can be determined using this method. This means that according to a rule relating to the pixel reassignment (see below), for example, it is not the entire intensity of a pixel but only the weighted component that is displaced. The arrangement according to the invention can be used to record the corresponding reference spectra. In a next step, spectral unmixing can then be carried out line by line, for example, and the respective spectral weights, from which the spectrally weighted components arise, can be determined. In addition to the method of spectral unmixing, there are, however, also other methods for separating spectral components, for example PCS, SCA, and the use of "deep learning".

The method according to the invention can serve, in particular, to determine a detection point spread function for at least one fluorescent dye. However, a particular advantage of the invention is that it is also possible to determine the detection point spread function for a plurality of dyes with different emission spectra from the measurement data of one measurement.

If allowed by the size of the utilized matrix sensor, specifically the number of pixels of this matrix sensor, a multipoint variant of the method according to the invention is also possible in principle. In this case, emission light which is emitted by a plurality of points on a sample that are illuminated by excitation light at the same time is simultaneously guided to the matrix sensor and evaluated. In this case, the excitation beam path and the detection beam path must be configured for multi-spot excitation and detection.

In a first preferred variant for the reversal of the spectral separation for the individual pixels of a pixel region, the intensity values measured by these pixels are combined by calculation, taking into account the spectral intensity distribution of the emission light for the dye associated with the pixel region and taking into account a spatial intensity distribution of individual spectral components on the matrix sensor.

Corresponding therewith and in order to reverse the spectral separation, the evaluation electronics of the detection apparatus according to the invention can be configured to combine, by calculation, the intensity values measured by pixels of a pixel region, taking into account a spectral intensity distribution of the emission light for the dye associated with the pixel region and taking into account a spatial intensity distribution of individual spectral components on the matrix sensor.

The spatial intensity distribution of the individual spectral components determines to what extent the spectral components of a point spread function of a dye that are displaced relative to one another on the matrix sensor spatially overlap in the dispersion direction.

In this case, an intensity distribution which is measured by pixels of a column perpendicular to the dispersion direction, in particular by pixels of the column in which the highest intensities are measured in the respective pixel region, can be used as the spatial intensity distribution of the individual spectral components. This is based on the assumption that the detection point spread function on the matrix sensor is rotationally symmetrical, that is to say circular. This is a good assumption if rotationally symmetrical optical units are used.

In another important group of method variants, the reversal of the spectral separation for the individual pixels of a pixel region is accomplished by a pixel reassignment. For spectrally non-resolving methods, this is known from image scanning microscopy (ISM); see for example [Castello et al. 2019].

Accordingly and in order to reverse the spectral separation for the individual pixels of a pixel region, the evaluation electronics of the detection apparatus according to the invention can be configured to assign the intensity values measured by the pixels to a location in the image plane that has been displaced relative to the respective pixel (pixel reassignment), with the displacement vector depending on the location of the respective pixel and the wavelength associated with that location.

In these method variants, the intensity values measured by the pixels are assigned to a location in the image plane that is displaced relative to the respective pixel (pixel reassignment) in order to reverse the spectral separation for the individual pixels of a pixel region. In this case, like with the known pixel reassignment, a displacement vector depends on the location of the respective pixel, but here also on the wavelength associated with this location.

Specifically, therefore, a displacement vector is determined for each pixel for the pixel reassignment, the said displacement vector being dependent on the location of the relevant pixel and the wavelength associated with the relevant pixel. The intensity value measured for the relevant pixel is then assigned to a location which is displaced relative to the relevant pixel by the displacement vector.

By way of example, a wavelength-independent component of the displacement vector can be obtained for a specific pixel by scaling a vector component of a vector from a reference pixel to the relevant pixel by a reassignment factor. A reassignment factor of $-\frac{1}{2}$ is obtained under the assumption that the point spread function for excitation and emission is identical (neglecting a Stokes shift), that is to say the intensity values measured by a specific pixel would be assigned to a location in the image plane which is just in the middle of the path from a reference pixel to the relevant pixel.

Specifically, the pixel reassignment is carried out in such a way that an obtained detection point spread function has substantially the same shape in the dispersion direction as perpendicular to the dispersion direction. This is based on the assumption that the detection point spread function must have a circularly symmetric intensity distribution when rotationally symmetric optical units are used.

However, there are other methods for obtaining the corresponding displacement vectors. By way of example, the displacement vectors which are associated with a wavelength range assigned to a sample structure can be determined by evaluating a phase correlation of a plurality of scanned images.

In the detection apparatus according to the invention, analog integrating and/or photon counting detectors can be used as matrix sensors. An sCMOS camera, an EMCCD camera, and/or a charge-integrating sensor are preferably used. The matrix sensor particularly advantageously comprises a SPAD camera or a SPAD camera is used as the matrix sensor. The matrix sensor, in particular the SPAD camera, is particularly preferably operated in a photon counting mode in which individual photons can be counted. This mode, which is also referred to as a "Geiger mode", is distinguished by a particularly favorable signal-to-noise ratio.

The costs for the sensors used, which have come down significantly in recent times, are particularly advantageous for the invention. The arrangements described herein are barely conceivable using conventional PMT technology with fiber coupling.

In particular, light-diffracting and/or light-refracting devices can be used as the dispersion device in the detection apparatus according to the invention. The dispersion device particularly preferably comprises a grating, in particular a line grating, and/or a prism. In principle, a grism, that is to say a combination of a prism and a grating, can also be used. Adjustable or controllable elements such as DMDs (DMD=Digital Micromirror Device), MEMS (MEMS=microelectromechanical systems) or SLMs (SLM=Spatial Light Modulator) are likewise possible.

In a particularly preferred variant of the detection apparatus according to the invention, the dispersion direction lies in the direction of, and in particular parallel to, a coordinate direction of the matrix sensor. By way of example, the pixels in the direction of the dispersion direction can be referred to as pixel rows and the pixels in the direction perpendicular to the dispersion direction can be referred to as pixel columns. The alignment of the matrix sensor in such a way that the dispersion direction is parallel to the direction of the pixel rows is advantageous in that the pixels in the pixel columns each are associated with exactly the same wavelength range or, to put it simply, with exactly the same wavelength.

With regard to the dimensioning of the matrix sensor and/or the optical imaging on the matrix sensor, it is preferable if a pixel pitch (in principle the lattice constant) of the matrix sensor is chosen to be greater than a change in the width of an Airy disk of the detection point spread function in the plane of the matrix sensor over a spectral bandwidth of a dye. In this context, it may also be preferable if the matrix sensor and/or the optical image on the matrix sensor are dimensioned in such a way that a spectral bandwidth per pixel of the matrix sensor in the dispersion direction is less than 0.5 nm, preferably less than 0.4 nm, more preferably less than 0.3 nm. In view of the calculation of the point spread function, specifically the implementation of the discrete deconvolution, these configurations allow an assumption that simplifies the calculation. More precisely, it can then be assumed, to a good approximation, that the width of the Airy disk over the course of the spectrum of a dye substantially does not depend on the wavelength. Nevertheless, a sufficient spectral resolution is obtained.

Particularly preferably, the matrix sensor and/or the optical image on the matrix sensor can furthermore be dimensioned in such a way that a diameter of an Airy disk of the detection point spread function in the plane of the matrix sensor is less than twenty times the lattice constant of the matrix sensor, particularly preferably less than seven times the lattice constant and particularly preferably less than five times the lattice constant of the matrix sensor. With this dimensioning, the calculation of the discrete deconvolution can advantageously be restricted to a comparatively small number of wavelengths, specifically to that number which corresponds to the number of pixels covered by the respective Airy disk.

Preferably, the diameter of the Airy disk on the matrix sensor can be greater than three times the lattice constant, and so it is ultimately possible to carry out a method which, in its final stage, is equivalent to an ISM.

SPAD array sensors are particularly suitable for measuring fluorescence lifetime information by means of TCSPC (time correlated single photon counting) or "histogramming" or "time windowed detection" (FLIM=fluorescence lifetime imaging microscopy). This requires pulsed excitation and an appropriately configured sensor. This and the combination with an Airyscan method is described, for example, in Nat Methods 16, 175-178 (2019). https://doi.org/10.1038/s41592-018-0291-9.

Moreover, a spectral resolution is rendered possible by the present invention. This combination, in particular, is very attractive.

In a preferred variant of the method according to the invention, time-resolved measurements for determining fluorescence lifetimes of the dyes are carried out using the matrix sensor, for example using some pixels of the matrix sensor and in particular using each individual pixel of the matrix sensor.

An advantageous development of the detection apparatus according to the invention is distinguished in that in order to determine the fluorescence lifetimes of dyes in particular, the matrix sensor and the evaluation electronics are configured to carry out time-resolved measurements, for example using some pixels of the matrix sensor and preferably using each individual pixel of the matrix sensor.

The matrix sensor and the electronics should therefore be designed in such a way for this use that preferably a time-resolved measurement is possible in such a way with each pixel that this allows a determination of the fluorescence lifetimes. These variants of the present invention thus enable the combination of spectrally resolved FLIM with image scanning. Pulsed lasers are advantageously used for these measurements.

In order to increase the detection efficiency of the matrix sensor, a microlens can be arranged in front of the matrix sensor, that is to say upstream of the matrix sensor.

The imaging optical unit of the detection apparatus according to the invention can comprise a zoom system for varying an image of the emission light, in particular for scaling the spectral bandwidth per pixel.

Finally, in a fundamentally known manner, the microscope according to the invention may comprise means for blocking out excitation light, in particular at least one emission filter. A changer device, for example a filter wheel, having a plurality of emission filters may preferably be present. However, the detection apparatus according to the invention also enables method variants in which spectrally undesired components of the emission light are not evaluated. For this purpose, the corresponding pixels, in particular pixel columns, of the matrix sensor, for example, can be set to be passive or inactive.

Figure 2:
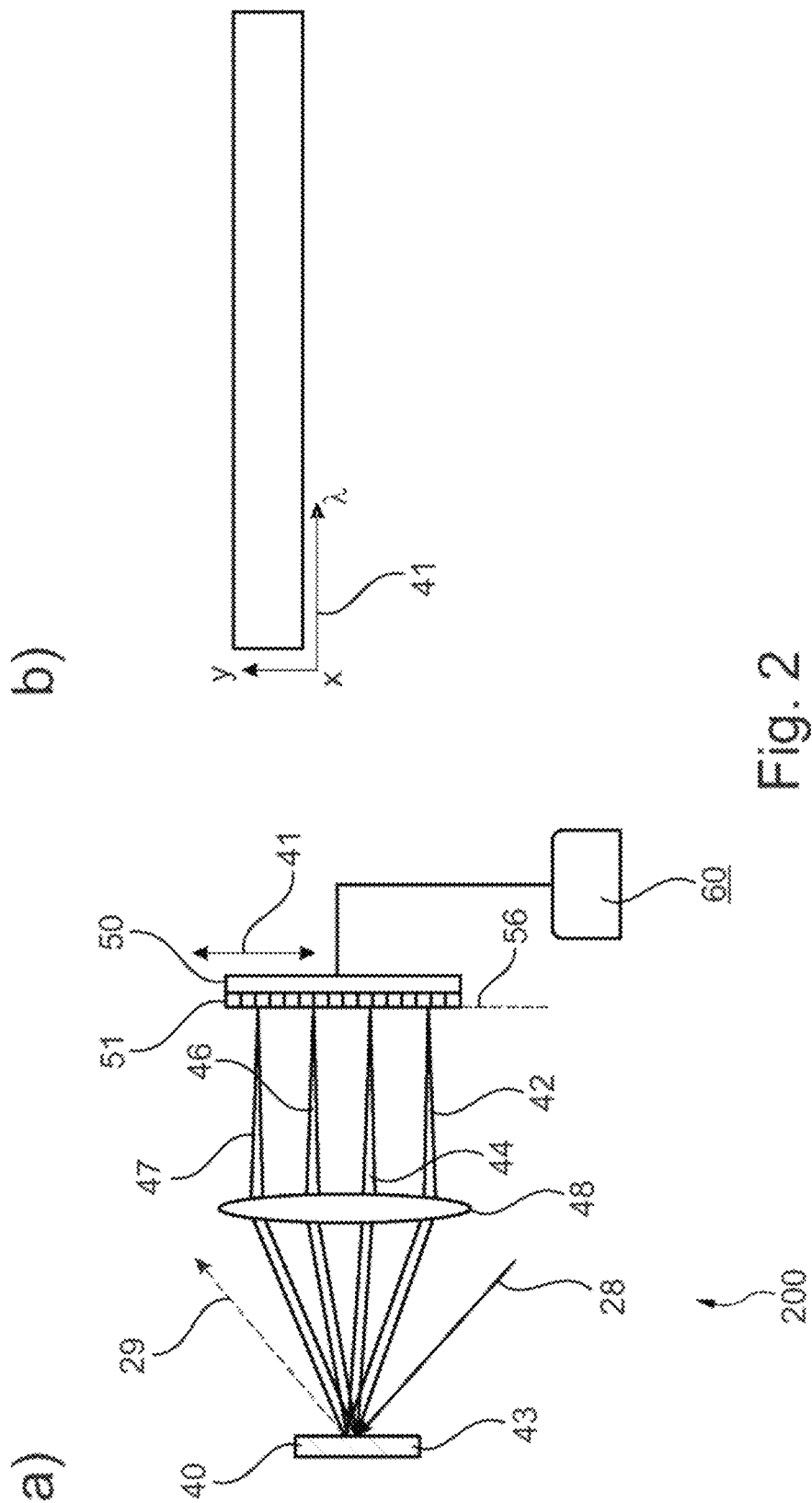
Figure 4:
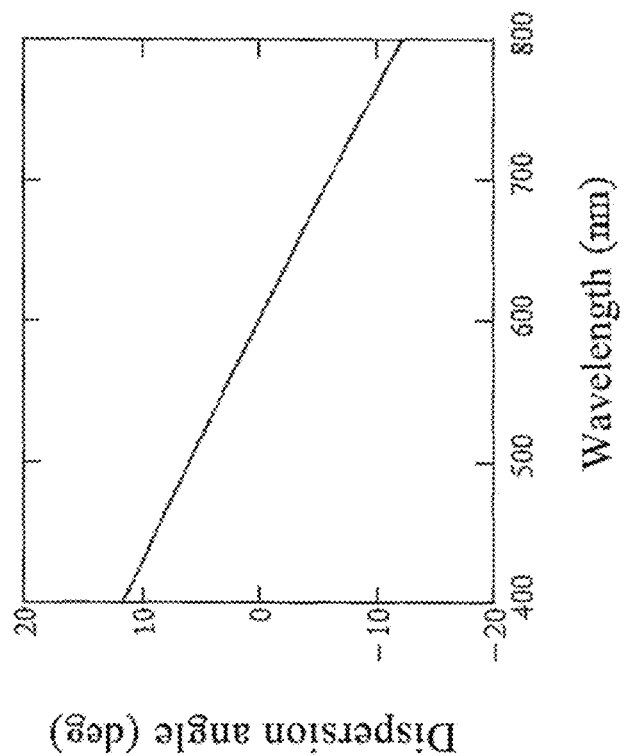
Figure 3:
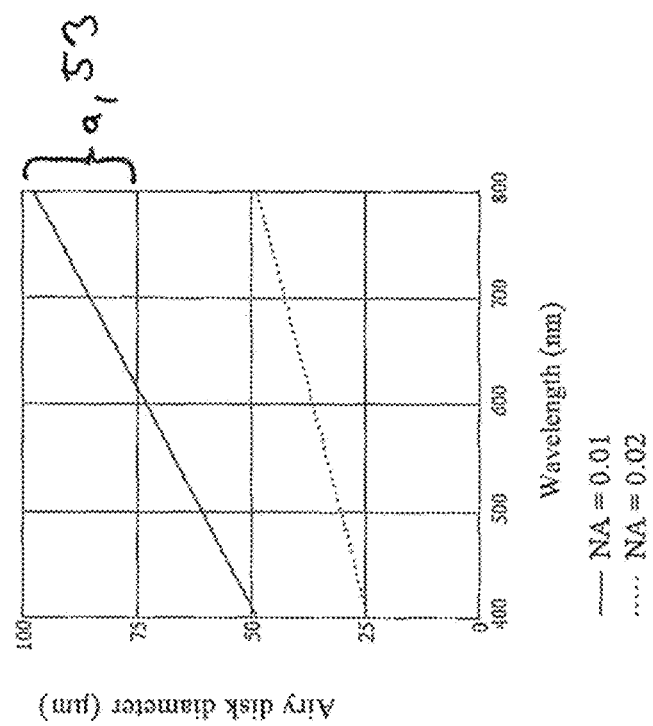
Figure 5:
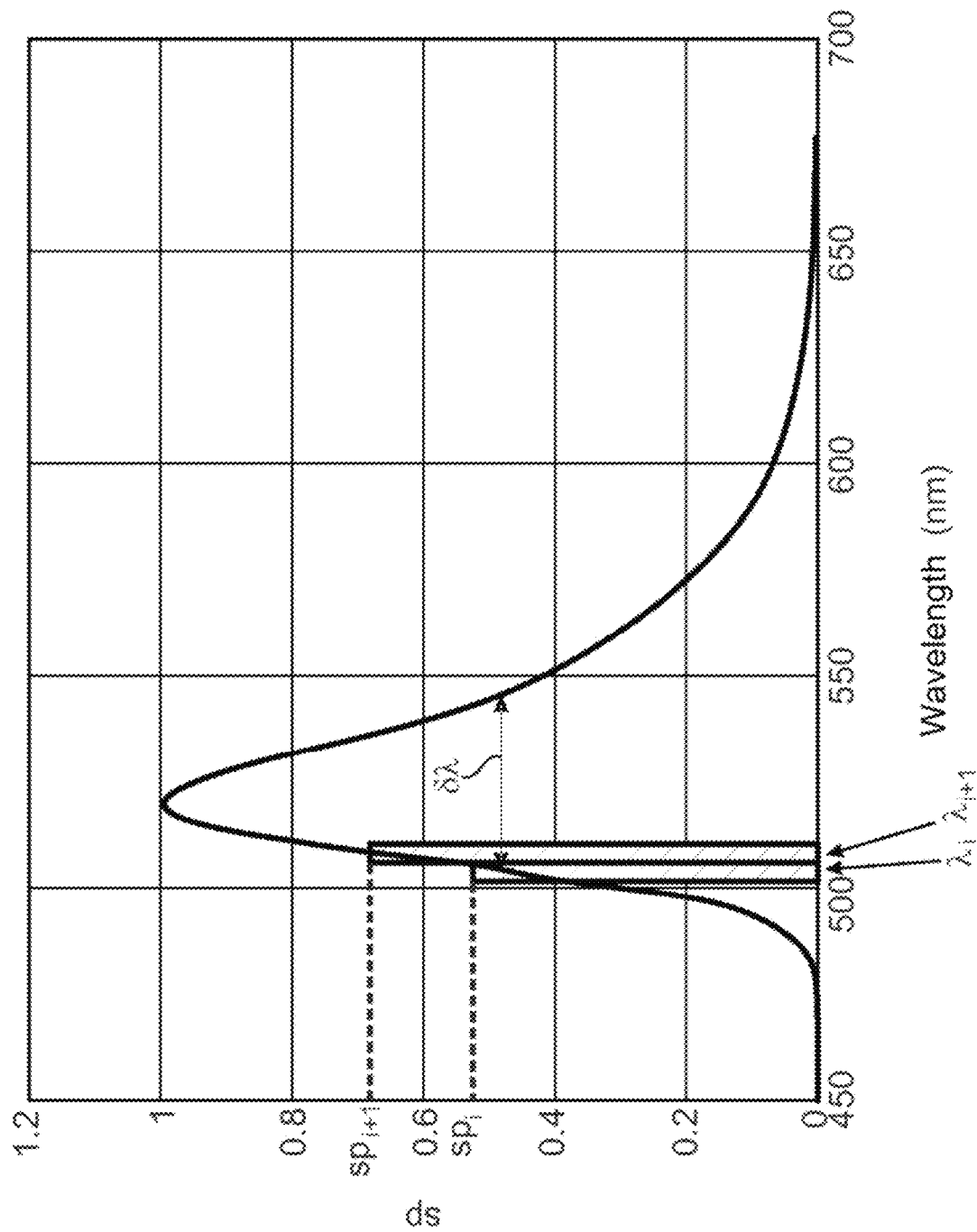
Figure 6:
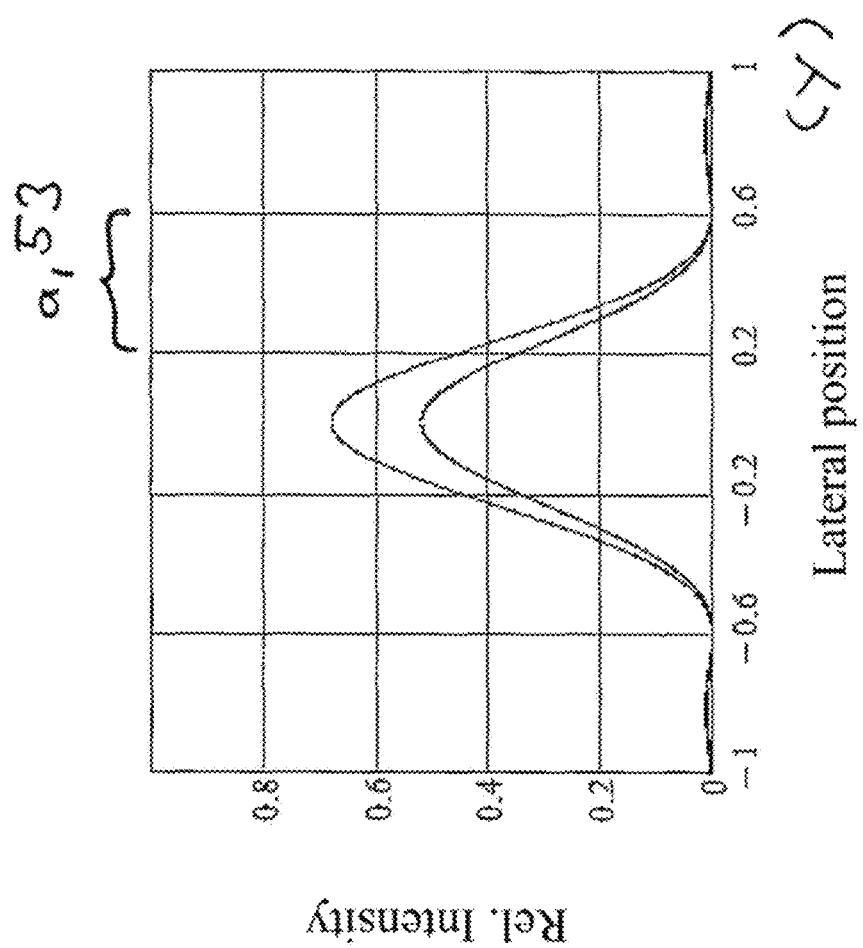
Figure 7:
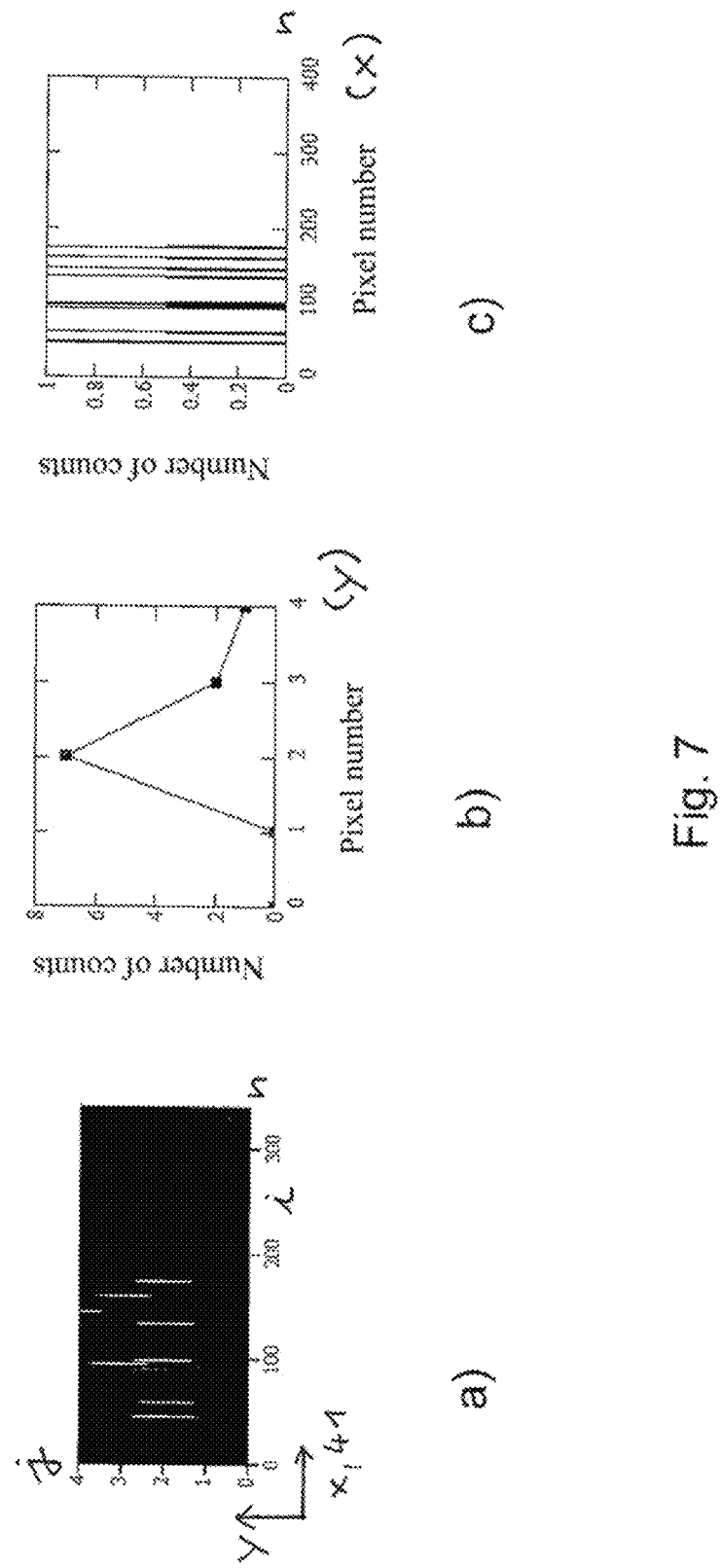
Figure 8:
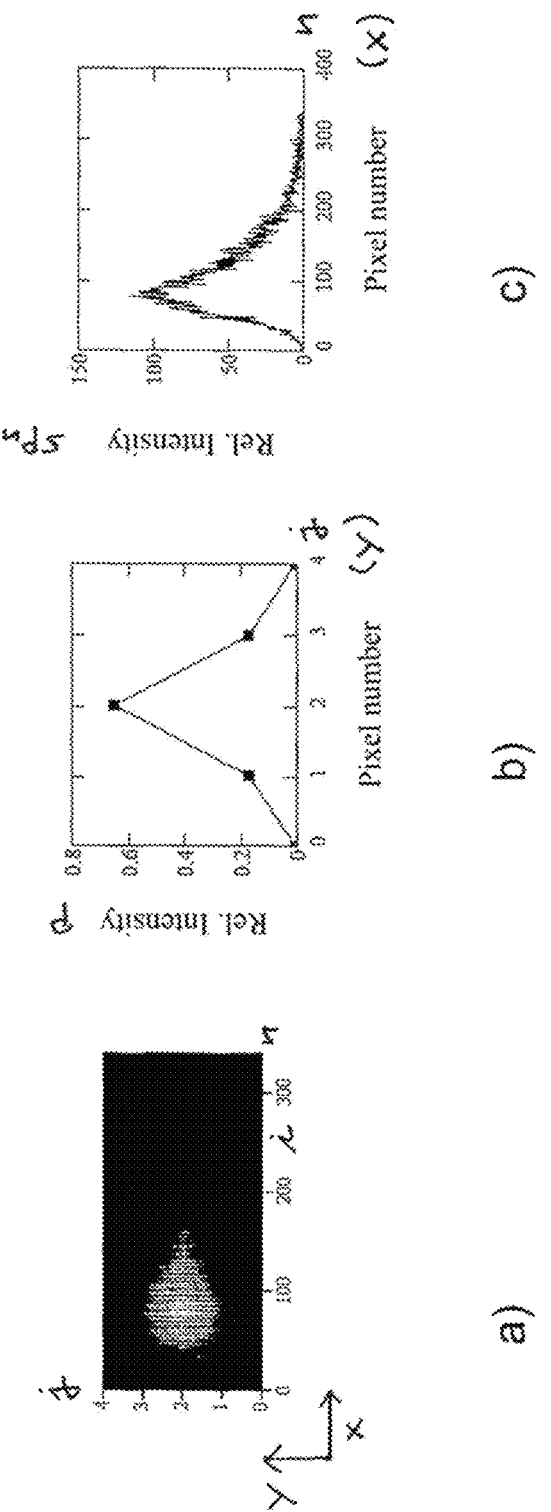
Figure 9:
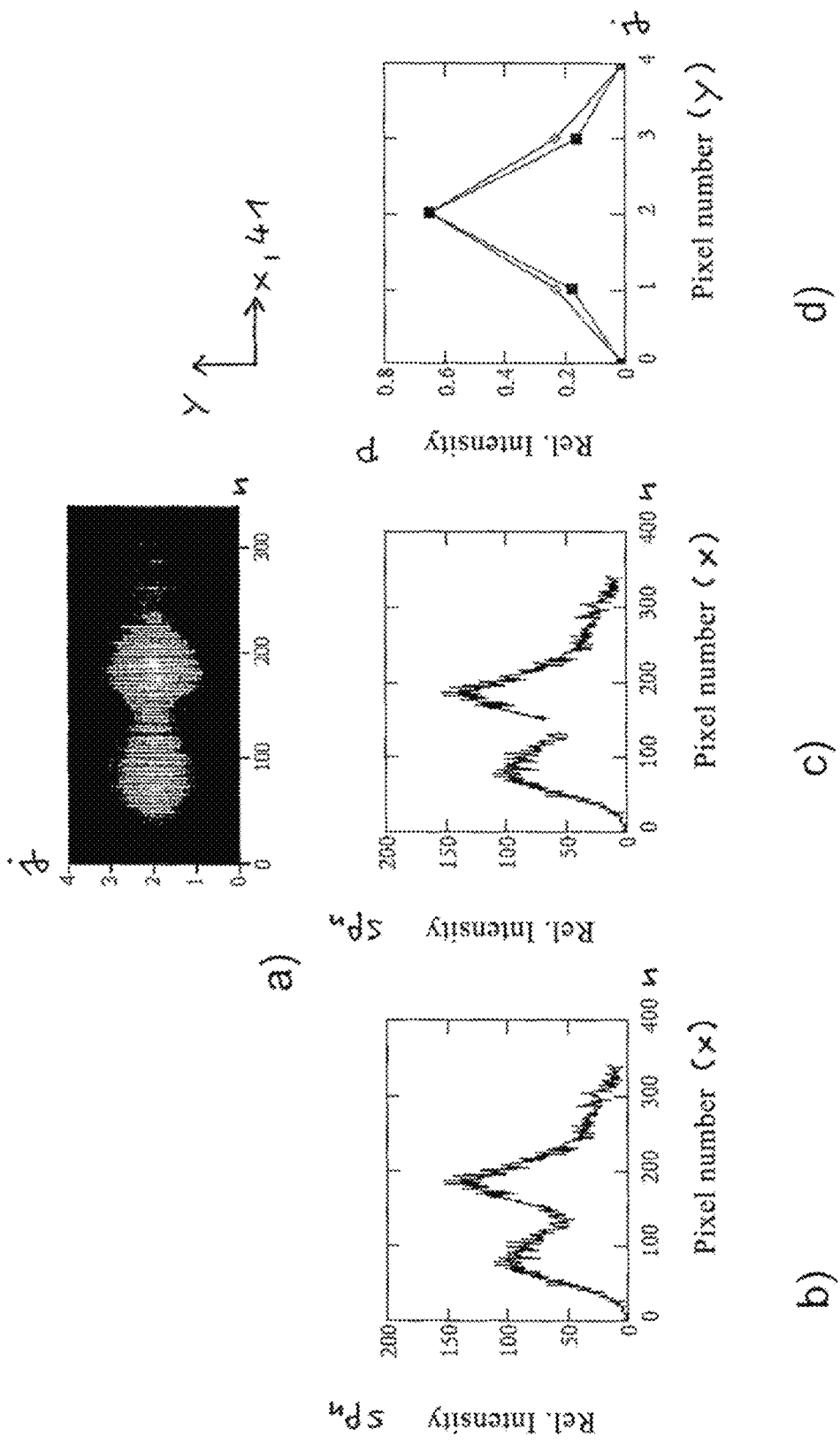
Figure 10:
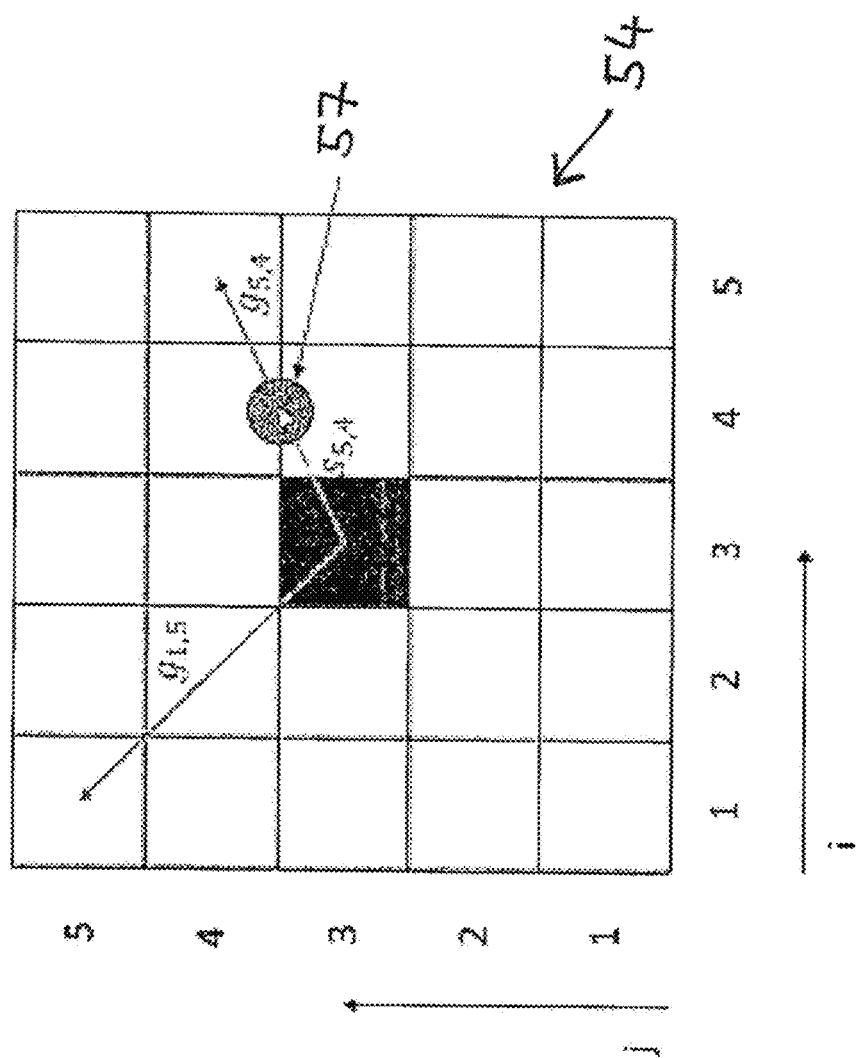
Figure 11:
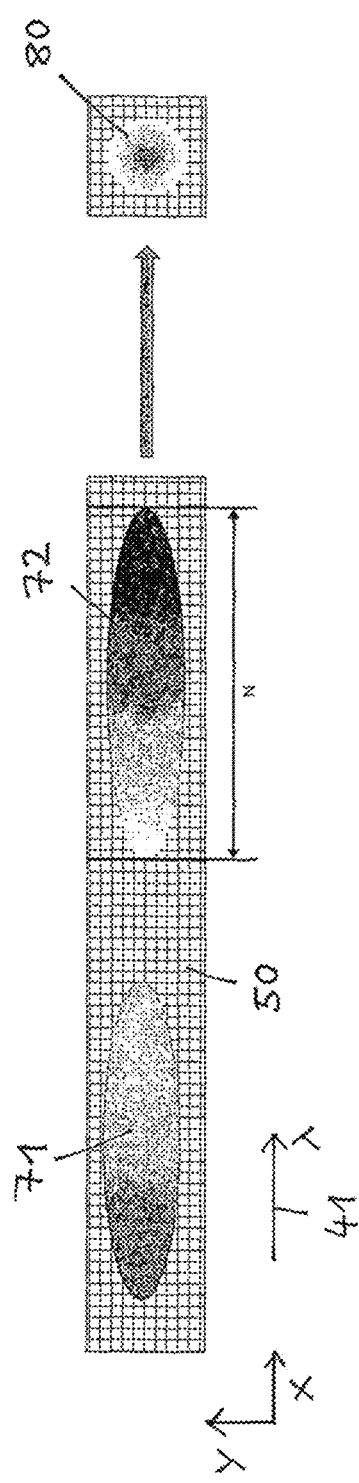
Figure 12:
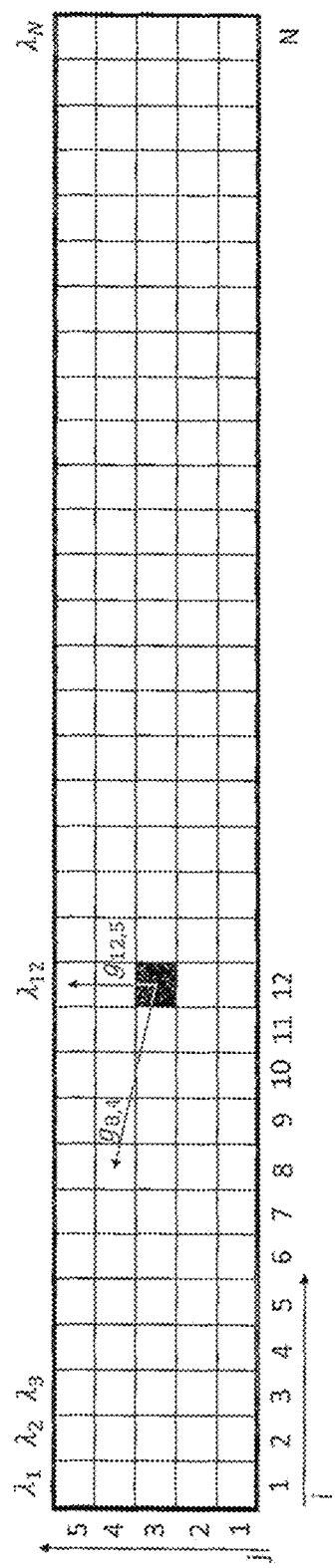

Further advantages and features of the method according to the invention, of the detection apparatus according to the invention, and of the laser scanning microscope according to the invention are explained below with reference to the attached figures. In the figures:

FIG. 1: shows a schematic view of a laser scanning microscope according to the invention;

FIG. 2: shows a schematic view of a detection apparatus according to the invention;

FIG. 3: shows a diagram for elucidating the diameter of an Airy disk as a function of the wavelength for different numerical apertures;

FIG. 4: shows a diagram for elucidating the curve of the dispersion angle in a diffraction grating as a function of the wavelength;

FIG. 5: shows a diagram with an emission spectrum of a typical dye;

FIG. 6: shows a diagram for elucidating the curve of a detection point spread function over a plurality of pixels of the matrix sensor in a direction perpendicular to the dispersion direction;

FIG. 7: shows a simulated image (FIG. 7*a*), a diagram for elucidating the count rate plotted against the pixel number in a pixel column (FIG. 7*b*), and a diagram for elucidating the count rate plotted against the pixel number in the dispersion direction (FIG. 7*c*);

FIG. 8: shows an image accumulated from many simulated images (FIG. 8*a*), a diagram for elucidating the averaged count rate plotted against the pixel number in a pixel column (FIG. 8*b*), and a diagram for elucidating an averaged count rate plotted against the pixel number in the dispersion direction (FIG. 8*b*);

FIG. 9 shows an image accumulated from many simulated images in the presence of two dyes in the sample (FIG. 9*a*), a diagram for elucidating the averaged count rate plotted against the pixel number in the dispersion direction for the two dyes (FIG. 9*b*), a diagram for elucidating the averaged count rate plotted against the pixel number in the dispersion direction with a spectral restriction to the emission regions of the dyes (FIG. 9*c*), and a diagram for elucidating the averaged count rate plotted against the pixel number in the pixel columns respectively associated with the emission maxima of the two dyes (FIG. 9*d*);

FIG. 10: shows a schematic representation of a matrix sensor without spectral resolution for the purposes of explaining the principle of pixel reassignment;

FIG. 11: shows a schematic representation of a matrix sensor of a detection apparatus according to the invention for the purposes of explaining the pixel regions and the underlying object of the invention; and FIG. 12: shows a schematic representation of a matrix sensor for a detection apparatus according to the invention for the purposes of explaining the principle of pixel reassignment with spectral resolution.

Identical and identically acting components are generally identified by the same reference signs in the figures.

FIG. 1 shows a schematic representation of a laser scanning microscope 100 according to the invention. As essential components, this microscope 100 initially comprises a light source 12, in particular a laser, for emitting excitation light 14; an excitation beam path 10 with a microscope objective 24 for guiding the excitation light onto or into a sample S to be examined; and a scanning device 22 in the excitation beam path 10 for scanning at least one illumination spot 27 over the sample S. A detection beam path 30 with the detection unit 32 for detecting the emission light 28 is also present for guiding emission light 28, in particular fluorescence light, to a detection unit 32, the said emission light having been emitted by the sample S as a result of exposure to the excitation radiation 14. The main color splitter 18 present according to the invention serves to separate the excitation light 14 and the detection light 28. Finally, there is a control and evaluation unit 34, which can in particular be a PC, for controlling the light source 12 and for evaluating measurement data obtained by the detection unit 32. According to the invention, the detection unit 32 includes a detection apparatus 200 according to the invention.

Excitation light 14 emitted by the light source 12 reaches the main color splitter 18 via a deflection mirror 16 and is guided in the direction of the scanning device 22, which can be arranged in a plane optically conjugate to the back pupil of the microscope objective 24, at the said main color splitter. From the scanning device 22, the excitation light 14 reaches the microscope objective 24 via a scanning objective and a tube lens, the said microscope objective focusing the excitation light 14 at an illumination spot 27 in a sample plane 26 on or in the sample S. Scanning objective and tube lens are illustrated schematically as one component 23 in FIG. 1.

The region exposed to excitation light 14 on or in the sample S then emits emission radiation 28, this typically being fluorescence light from the dyes with which the sample S was prepared in advance. The emission radiation 28 then travels back to the main color splitter 18 along the same path in the "descanned" detection beam path 30 that the excitation light 14 took previously, but it is transmitted by the said main color splitter and then reaches the detection unit 32, which comprises a detection apparatus 200 according to the invention. The data measured by the detection unit 32 are evaluated by the control and evaluation device 34. The control and evaluation device 34 may also serve to control the light source 12 and the scanning unit 22.

The microscope 100 according to the invention is a confocal laser scanning microscope in particular.

FIG. 2*a*) shows a schematic representation of an exemplary embodiment of a detection apparatus 200 according to the invention. As essential components, the detection apparatus 200 for the spectrally resolved detection of emission light 28 in a laser scanning microscope 100 comprises: a dispersion device 40 for the spectral separation of emission light 28 coming from the sample S being examined, a two-dimensional matrix sensor 50 for the spatially resolved detection of the spectrally decomposed emission light, and an imaging optical unit 48 for guiding the spectrally decomposed emission light onto the two-dimensional matrix sensor 50.

In the exemplary embodiment illustrated in FIG. 2*a*), the dispersion device 40 is a line grating 43, more precisely a reflection grating, with the emission light 28 to be detected being incident on the line grating 43 at an angle from below. Instead of the grating 43, a prism or a grism can also be used. A defined spectral smearing of the signal on the matrix sensor 50 is decisive, the said spectral smearing, in principle, being able to be both linear and non-linear with regard to the wavelength distribution over the location. It just has to be monotonic. In the exemplary embodiment shown, the lines of the grating 43 extend perpendicularly to the plane of the drawing, which leads to spectral splitting in a dispersion direction 41 running vertically in FIG. 2a). Light of the zeroth order of diffraction is identified by reference sign 29. The light of the zeroth order of diffraction 29 can either not be used or, in order to increase the detection efficiency, optionally with a rotation of the polarization, be guided onto the grating 43 again along the incident light.

Emission light 28 confocally filtered by a pinhole (not depicted here) is collimated by an optical system (likewise not depicted here) and steered to the dispersion device 40.

The individual spectral components 42, 44, 46, 47 are then incident on the imaging optical unit 48, which is depicted schematically as a lens element in FIG. 2a). In principle, the imaging optical unit 48 may also comprise a plurality of beam-shaping components and, in particular, a zoom system as well.

The imaging optical unit 48 focuses the different spectral components 42, 44, 46, 47 on the matrix sensor 50 with a multiplicity of pixels 51. The matrix sensor 50 can, for example, be a SPAD multi-line camera having, for example, 5 lines with 800 pixels each, corresponding to 800 columns.

FIG. 2b) shows a schematic representation of the area of the matrix sensor 50. The matrix sensor 50 is positioned relative to the grating 43 in such a way that the dispersion direction 41 runs in the direction of the rows, that is to say parallel to the x-direction of the coordinate system shown in FIG. 2b). The direction of the columns runs parallel to the y-direction. By way of example, in FIG. 2b), the blue spectral components may be located on the left edge and the red spectral components may be located on the right edge of the spectrum. The indices l and j are used to label the columns and rows, respectively, of the matrix sensor 50, that is to say the pixel (i,j) is the pixel in the i-th column in the j-th row.

FIG. 2a) schematically illustrates the evaluation electronics 60 present according to the invention, which are connected to the matrix sensor 50 and configured, during the evaluation of the intensities $I_{i,j}$ measured by the pixels (i,j) of a pixel region, to reverse the spectral separation for these pixels (i,j). These functions are explained in detail below.

The evaluation electronics 60, which may also comprise a data grabber, may be implemented, for example, in an FPGA, in a microcontroller, or in comparable components. It is essential that a reduction in the data volume is achieved as close to the hardware as possible, that is to say as close as possible to the matrix sensor 50, so that the data are able to flow as continuously as possible from the evaluation electronics 60 to a control PC, that is to say to the control and evaluation unit 34 of the microscope 100 according to the invention from FIG. 1 in particular.

The situation in FIG. 2a) can also be described as the dispersion element 40 generating a large, defined chromatic aberration in the dispersion direction 41, with the result that the different wavelengths are pulled apart and therefore rendered separately detectable. In the direction perpendicular thereto, that is to say in the y-direction in FIG. 2b), the point spread function remains essentially unchanged. However, spectrally dispersing the emission light 28 destroys the point spread function to such an extent that it is not obvious how to achieve ISM imaging using such a system.

In order to now achieve this, the imaging optical unit 48 is initially dimensioned relative to the dimensions of the matrix sensor 50, that is to say relative to the dimensions of the SPAD camera in the example shown. By way of example, the matrix sensor 50 can have a pixel pitch, which can also be referred to as the lattice constant of the matrix sensor 50, of a=25 μm.

The diameter of an Airy disk is known to depend on the wavelength of light and the numerical aperture as follows:

$$d_{Airy} = \frac{1.22\lambda}{NA} \quad (1)$$

To evaluate the signal for ISM, the point spread function must be oversampled by at least three to four pixels per spatial direction. In order to attain this for the relevant wavelength range from 450 nm to 800 nm, a detection-side numerical aperture of approximately NA=0.01 is required when the sensor is illuminated. This emerges from the diagram in FIG. 3, where the diameter of an Airy disk is shown as a function of the wavelength for various numerical apertures. In this case, the grid of the y-axis in the diagram in FIG. 3 corresponds to the assumed pixel size of the SPAD camera of 25 μm.

FIG. 4 shows the curve of the dispersion angle in degrees over the wavelength in nm for a grating with 1000 lines/mm. If, for example, a focal length of f=50 mm is assumed for the imaging optical unit 48 between the grating 43 and the SPAD camera 50, this yields a distribution of the spectrum over approximately 730 pixels for the aforementioned spectral range. The spectral bandwidth deposited on a pixel 51 is thus approximately $\Delta\lambda$(pixel)=0.5 nm.

In principle, the various spectral components must be integrated numerically in order to recover the point spread function from the dispersively smeared signal distribution. Once the intensities of the pixels have been obtained in this way, the image scanning microscopy (ISM) method can be applied in the next step.

The intensity incident on a particular pixel 51 is denoted by $I_{i,j}$, where the index i denotes the number of the column, that is to say runs in the x-direction and in the dispersion direction 41. The index j denotes the number of the row and thus runs in the y-direction.

The intensity $I_{i,j}$ can be written as:

$$I_{i,j} = \int_{\Delta\lambda} Sp(\lambda) \left[ \int_{\Delta x_i} \text{Airy}(x - x_0(\lambda), \lambda) dx \int_{\Delta y_j} \text{Airy}(y - y_0(\lambda), \lambda) dy \right] d\lambda \quad (2)$$

Here, $Sp(\lambda)$ is the emission spectrum of the excited fluorescent dye and Airy $(x,\lambda)$ is the Airy function corresponding to the spatial intensity distribution of the point spread function, with the wavelength $\lambda$ in the Airy function representing a parameter which, in particular, determines the width of the Airy function Airy$(x,\lambda)$. $x_0$ denotes the center of the point spread function. The center of the point spread function, that is to say the point of maximum intensity, is then defined by the dispersion $x_0(\lambda)$ and by an adjustment by optical means to a column center $y_0$.

Typically, the spectral distributions of common fluorescent dyes (fluorophores) have spectral bandwidths of approximately $\delta\lambda$=50 nm (see FIG. 5). According to the graph in FIG. 3, the change in the width of the Airy function over this bandwidth is significantly less than 10 μm. Thus, an error of no more than a quarter of a pixel, which occurs especially in the weakly emitting edge areas of the spectrum and therefore contributes little, is made if the width of the spectral emission centroid is set to $\lambda_0$, for the point spread function. Thus, Airy(y−y$_0$,λ) can be replaced by Airy(y−y$_0$, λ$_0$) to a good approximation. This renders the PSF term along the y-coordinate independent of λ and it can be pulled out of the integral over the λ-coordinate.

A one-dimensional deconvolution problem now remains in the calculation of the unperturbed Airy function from the spectral smearing in the x-direction when the spectrum Sp(λ) of the excited fluorescent dye is known. The computing and hardware effort in this context should not be underestimated. After all, the signal from at least 4×730 pixels must be evaluated.

Further assumptions, as set forth below, can be made in order to further reduce the computational burden on the evaluation electronics 60. The first assumption made is that the unperturbed point spread function is radially symmetric. This means that the spatial expansion of the point spread function along the spectrum in the dispersion direction 41, that is to say in the x-direction, can be determined from the readable intensity distribution orthogonal thereto, that is to say in the y-direction I$_j^{(y)}$. Moreover, the spectral bandwidth per pixel at Δλ<0.5 nm is very low, and so the dispersive signal smearing due to the pixel extent can be neglected to a good approximation, with the result that the spectrum per pixel can be assumed to be piecewise constant. Moreover, the width of the integration range, that is to say the number of pixels over which the integral must be formed, can also be determined from the intensity distribution determined in the orthogonal direction, that is to say the y-direction. The diagram in FIG. 3 makes it clear that integration over five pixels is entirely sufficient. This yields the following discretization of the problem described:

$$I_{i,j} = I_j^{(y)} \sum_{n=i-2}^{i+2} sp_n \int_{\Delta x_i} \text{Airy}(x - x_0(\lambda_n))) dx \tag{3}$$

Here, sp$_n$ is the discretized intensity of the fluorescent dye at the spectral position of the relevant pixel. The task now is to determine the components of Airy functions centered in neighboring pixels in the intensity I$_{i,j}$ measured at the pixel (i,j). In this respect, too, an approximation can be obtained from the data measured in the orthogonal direction, that is to say in the y-direction.

Initially, the sum of the signal over all pixels perpendicular to the dispersion direction, that is to say over all pixels in a column, is advantageously calculated. This yields the spectrum of the emission which can be normalized, with the result that a distribution as shown in FIG. 5 emerges. From this, it is possible to determine the discretized values sp$_i$ of the spectral distribution required for calculating the discretized integral. FIG. 5 shows, by way of example, the value of the spectrum sp$_i$ for a first pixel (i,j) at a first wavelength λ$_i$ and the value of the spectrum sp$_{i+1}$ at an immediately neighboring pixel (i+1, j), which corresponds to a wavelength λ$_{i+1}$. Once the spectral distribution has been determined, the contributions of the neighboring pixels i−2, i−1, i+1, i+2 to the pixel i can be determined from the intensity relationships along the y-direction. In the example of a spatial distribution of the Airy function shown in FIG. 6, the following proportionate intensity distribution would result for the five pixels at the value sp$_{i+1}$ of the spectrum:

$$I^{cal}_i = (I(i-2), I(i-1), I(i), I(i+1), I(i+2)) = (0.008, 0.16, 0.65, 0.16, 0.008)$$

FIG. 6 also shows the lower values, corresponding to the spectrum in FIG. 5, of the point spread function for sp$_i$ at the spectral position i, that is to say for the pixel i of the SPAD camera 50 neighboring the pixel number i+1.

The values determined thus allow the discretization of the last remaining integral ∫$_{\Delta x_i}$Airy(x−x$_0$(λ$_n$))dx. Then, the following representation for the intensity I$_{i,j}$ measured in the pixel (i,j) is obtained:

$$I_{i,j} = \sum_{n=i-2}^{i+2} sp_n P_{n,j} = \sum_{n=-2}^{2} sp_{i-n} P_{i-n,j} \tag{4}$$

Here, P$_{n,j}$ is the determined component at the pixel (i,j) of the intensity of the Airy function centered at a neighboring pixel n. The contributions of I$_j^{(y)}$*∫$_{\Delta x_i}$ Airy(x−x$_0$(λ$_n$))dx are contained in P$_{n,j}$. The last step is to rearrange the intensity content of the pixels to the displacements n spanned by the summation sign. This is because, ultimately, it is not the signal from a specific pixel (i,j) that is of interest, but the sum of associated sampling components of the point spread function for a fluorescent dye. The index rearrangement corresponds physically to a displacement of the spectrally dispersed emission point spread functions to a common reference position, as can be achieved optically, for example, by a second pass through a dispersion prism. This yields the following expression for the point spread function determined solely from measured data:

$$I|_{n=-2,...,2,j} = \sum_i sp_{i-n} P_{i-n,j} \tag{5}$$

In the case of a photon-counting matrix sensor in the Geiger mode, the P$_{i-n,j}$ assign the photons detected per matrix sensor pixel N$_{i-n,j}$ to the subpixels of the PSF to be determined, according to the previously calibrated specific distribution of the PSF at a given sensor position, as follows:

$$P_{i-n,j} = I_{i-n}^{cal} \cdot N_{i-n,j} \tag{6}$$

This implements the reversal according to the invention of the spectral splitting for the pixels of the pixel region associated with the dye under consideration.

Should the error generated by neglecting the dispersive signal smearing appear too large, countermeasures can be taken using a larger sensor array and a longer focal length of the imaging optical unit. Using an array of, for example, 4×1400 pixels and a focal length of f=100 mm, the bandwidth per pixel is already Δλ<0.25 nm. A reasonable operating point can thus be found in any case. The matrix sensor 50 does not have to be restricted to a few rows. Significantly more image lines are allowed if a high frame rate can be achieved, and this then also renders measurements with multipoint excitation possible. The method according to the invention benefits from such a parallelization because the pixel dwell times can then be lengthened by the factor of the parallelization at a given frame rate.

The limitation of the number of photons in the LSM is problematic for the application of the above-described principle. The matrix sensor 50 supplies digital signals, that is to say photons per sensor pixel and image. A single image of the matrix sensor 50 is subsequently converted into one pixel of an entire LSM image. Since the photon flux incident on the matrix sensor 50 can be of the order of a few megahertz, for example, and the pixel dwell time of the LSM should be of the order of one µs, only a few photons per pixel dwell time are distributed overall over the 4×730 pixels, for example. Accordingly, most of the pixels of the matrix sensor 50 will supply zero as the datum and only a few pixels will supply one. Therefore, a direct single readout of the matrix sensor 50 may not yet deliver a usable result. In addition, the emission and detection of the photons are statistical events, and so the distribution of the photons in the long-term average cannot yet be derived from a single image with such a small number of photons. This is illustrated in FIG. 7a), where a single image from a SPAD camera 50 for exposure to the dye spectrum from FIG. 5 was simulated with a photon flux of Iphot=10 MHz for an exposure duration of 1 µs. The spectral bandwidth per pixel is 0.5 nm. Only a few events are seen, clustered around the dye emission maximum at approximately 520 nm and on the central line of the five-line SPAD camera 50. FIG. 7b) shows the sum of the signals in each case along the image lines (in the x-direction) of the SPAD camera 50, which reproduces the point spread function. FIG. 7c) shows the sum of the count events of all pixels in a column, that is to say in the y-direction, and is identical to the detected spectrum of the dye. It is self-evident that the algorithm explained above cannot yet be meaningfully applied to the data in FIG. 7.

Accordingly, the system needs to be calibrated with an integrated image. However, in principle, this is a very fast process and generally does not require more than one image scan. This is illustrated in FIG. 8a) for an average of 1000 individual images with a mean photon flux of 10 MHz. The integration time is then only 1 ms and approximately corresponds to the scan of an image line. The point spread function in FIG. 8b), determined from the summed signal, almost exactly reproduces the above-described intensity distribution to be expected over the five pixels, and the spectrum in FIG. 8c) can also be understood.

From the measurements of FIGS. 8b) and 8c), it is possible to obtain data for $sp_{i-n}$ and $P_{i-n,j}$, which can be stored in a memory of the evaluation electronics 60, for example. The SPAD images per scanned image pixel can then be evaluated according to the rule (equation 5). Integer photon number values can already be converted to floating point values in order to obtain the brightness ratio.

A second option for reversing the spectral separation, according to the invention, for the pixels of a pixel region that is assigned to a dye is based on the method of pixel reassignment. It will be described with reference to FIGS. 10-12.

Initially the known method of pixel reassignment is explained on the basis of FIG. 10, with illustration orienting itself in terms of terminology on [Castello et al. 2019].

The situation of image scanning is considered, in which a sample is scanned using a punctiform illumination source and the intensity radiated back by the sample is measured in spatially resolved fashion using a confocal two-dimensional detector array fixed relative to the sample. Let the confocal matrix sensor have n by m pixel (i,j) with indices i j, which run from 1 to n and m, respectively.

As the intention is to evaluate the spectral measurements on a rectangular array at a later stage, a rectangular array will be assumed here for the sake of simplicity. However, this is not a restriction in itself and, in principle, other geometries of pixelated sensors can also be considered. In particular, hexagonal arrangements are often used because a good fill factor can be obtained therewith.

Then, for a clear representation, the assumption is made that the magnification from the object plane to the intermediate image plane is 1. Also, it is advantageous to assume that each pixel of the sensor is smaller than 1 Airy unit (Airy unit=AU). This case corresponds to the standard assumption in image scanning that the PSF is detected in a spatially oversampled manner and that each pixel represents an effective pinhole which is smaller than 1 AU (or smaller than 0.8 AU or, even better, smaller than 0.3 AU); see above. In principle, the arrangement also works with a PSF smaller than the pixel size. However, in that case it is only possible to measure the spectrum and record spectral confocal images. Image scanning then cannot be used in a meaningful way.

The image scanning microscope can be considered to be a linear and space-invariant system, that is to say the sample plane is imaged linearly into the image plane 56 of the matrix sensor. Let the variable x denote the location in the image plane 56, that is to say the plane of the matrix sensor, projected back into the sample plane. If the scanning position at the point x is in the sample, that is to say if, in other words, the maximum of the illumination intensity is at the location x in the sample, then the intensity $g_{i,j}(x)$ measured by the pixel (i,j) can be described as a convolution as follows:

$$g_{i,j}(x)=(h_{i,j}*f)(x)=\int h_{i,j}(x-x')f(x')dx' \qquad (7)$$

Here, $h_{i,j}(x)=h^{exc}(x)h^{em}(x-d_{i,j})$ is the effective PSF for the respectively considered sensor pixel. $h_{i,j}(x)$ is the product of the PSF $h^{exc}(x)$ of the excitation and the PSF of the emission $h^{em}(x-d_{i,j})$. The PSF $h^{exc}(x)$ of the excitation can in principle be measured and can be assumed to be known. In order to obtain a correct PSF of detection, $h^{em}(x-d_{i,j})$ would have to convolved with the aperture function, which describes the geometric shape of the pixel, if the size of an individual pixel is not negligible. d is an in-plane vector of the detector array corresponding to the offset between the reference element, for example an element at the center of the sensor, and the pixel (i,j). $d_{i,j}$ can thus be written as $$d_{i,j} = \begin{pmatrix} d_{i,j}^x \\ d_{i,j}^y \end{pmatrix} \qquad (8)$$

In a simplified consideration, the assumption can be made that the maximum of the effective PSF $h_{i,j}(x)$ is located approximately in the middle between the maxima of the functions $h^{exc}(x)$ and $h_{i,j}(x-d_{i,j})$, that is to say approximately at a position $s_{i,j}=d_{i,j}/2$. This would be exactly the case for an aberration-free system if the excitation PSF and the emission PSF were identical, which would be the case for fluorescence without a Stokes shift. The basic concept of pixel reassignment assumes that most of the intensity measured by the pixel (i,j) comes from a location in the sample that does not correspond to the location coordinate of the relevant pixel in the image plane 56. In the simplified consideration, where the assumption is made that the effective PSF has its maximum in the middle between the maxima of the functions $h^{exc}(x)$ and $h_{i,j}(x-d_{i,j})$, the location from which the intensity by the measured pixel (i,j) originates is at the location $s_{i,j}=d_{i,j}/2$ in the sample plane.

The basic concept of pixel reassignment and image scanning lies in displacing the signals that have been displaced in relation to the reference pixel back in the direction of the reference pixel and in adding the said signals. In principle, this is intuitively clear, because each pixel (i,j) of the matrix sensor in the confocal system operated in this way supplies a displaced image. In addition to the return displacement, the images can also simply be registered to one another or other forms of calculation, such as multiview deconvolutions, can be used to advantageously combine signals from all pixels with one another by calculation.

FIG. 10 shows the situation and the labels for the case of confocal image scanning using a matrix sensor 54 with 5×5 pixels. The pixel (3, 3) in the middle serves as a reference pixel. The circle 57 represents the centroid of the effective PSF for the pixel (5, 4). However, the extent of the PSF is generally significantly larger than this circle 57, which is only shown in FIG. 10 for elucidating the position of the maximum of the PSF.

Image scanning is known to achieve better optical resolution and an improved signal-to-noise ratio (SNR). The use of filters to achieve color dependency in image scanning is known. The use of a strip grating, with which a PSF containing two colors is measured and evaluated, is also known.

But it is obvious that significantly more information is obtained if the spectrum is measured directly at a plurality points. This may further serve for spectral unmixing of the data. Additionally, it would be advantageous to be able to use the positive properties of image scanning for such measurements as well.

Using the detection apparatus according to the invention described here, it is possible, for example to carry out a measurement in such a way that the spectral components of a specific emission band, which correspond to a pixel region on the matrix sensor 50, are spectrally combined so that, for this spectral band, the method of so-called image scanning (also referred to as Airy scanning or optical reassignment) can be carried out. This combining is what is referred to in the terminology of the independent claims as reversal of the spectral splitting.

In order to bring about the combination of the pixels associated with an emission band, it is necessary for the dispersive influence of the grating or another dispersive device to be reversed for a number of N contiguous pixels, that is to say for the pixels of a pixel region.

Ultimately, this is comparable to a situation in which the light is allowed to run back through the dispersive element in such a way that the dispersion is reversed. This would then give rise to a PSF which only contains the spatial information and in which the spectral components are again spatially superposed in a point spread function. Something like this is described in US2019258041, for example. However, a reversal of the dispersion with optical means is not always possible. By way of example, gratings are preferably used for spectral splitting because these produce a linear dispersion. On account of the limited efficiency, however, the multiple use of a grating, that is to say both on the outward and return path of the light, is not advantageous. Moreover, purely optical arrangements for the reversal of the dispersion are complex, expensive, and difficult to adjust.

In the case of a linear dispersion, as produced by a grating, the relationship $\lambda = kx$ applies to the assignment of the wavelength along the longitudinal direction x of the matrix sensor. Here, k is a constant of proportionality which depends on the strength of the dispersion, that is to say on the line width of the grating. The unit is therefore nm/mm. In principle, however, the considerations do not only apply to a grating but can also be applied to a prism as a dispersive element. However, the relationship between the location on the sensor and the wavelength can then no longer be described using a simple linear relationship in that case. The calibration and the evaluation of the measurements are then somewhat different.

Moreover, the use of a grating is preferable because the linear dispersion leads to optimal sampling of the spectrum over the wavelengths (pixels per wavelength) and the relationship between location and wavelength remains linear. The use of prisms is optically a little more efficient under certain circumstances, but leads to better sampling of the blue part of the spectrum, while the red wavelengths are spectrally "compressed" and are therefore not sampled as well. However, precisely this is disadvantageous, since there is a more sparing excitation/detection for longer chosen wavelengths, especially for the imaging of living samples. Multiple staining should be easily detectable here, especially with the arrangement according to the invention.

An exemplary embodiment is to be specified here. FIG. 11 shows a matrix sensor with two schematically shown spectral bands, which correspond, for example, to the spectral signature of a fluorescently radiating sample with a blue-green emission region (pixel region 71) and with a more orange-red emission region (pixel region 72). In principle, the task set for the data evaluation is to combine a specific spectral band, and hence the signals of the pixels of a pixel region 71 and/or 72, in such a way that one or two circularly symmetric point spread function(s) 80 (PSF) arise(s). A subsequent or simultaneous evaluation of the PSF obtained in this way using image scanning methods known per se can lead to an image of the sample in which the advantageous properties of image scanning are combined with a spectral resolution, that is to say both dyes can be represented in the picture. In order to keep the representation transparent, an assumption initially made in this case was that the dyes are separated spectrally to such an extent that they fall on different pixels of the sensor. This case is advantageous. However, the arrangement can also be used to image and measure samples with spectrally overlapping dyes or fluorescent proteins. This was explained in the general part of the description.

FIG. 12 shows a detail of a matrix sensor 50 of a detection unit according to the invention, with pixels (i,j) used to measure the dispersed emission light 28. The emission light 28 is dispersively split along the direction I This means that each column i is assigned a wavelength. There is no dispersive wavelength splitting in the direction j, that is to say only spatial information is available there. In the situation shown in FIG. 12, the pixel (12, 3) represents the reference pixel with the associated reference wavelength $\lambda_r$, to which the signals of the other pixels are related. This means that the signals from the other pixels are pushed back to the reference pixel (12, 3) in a manner similar to what has been done to date in the known image scanning microscopy. "Pushing back" in this case means that the signals of the respective pixels are assigned to numerically determined locations in the plane of the matrix sensor and hence in the sample plane. In contrast to the known methods, however, the displacement in this case must be carried out in such a way that the dispersion is correctly taken into account.

Thus, the essential change is that the assumption is made for the displacement vector $d_{i,j}$ that the displacement path consists of two parts:

$$d_{i,j} = 2s_{i,j} + \xi_i$$

$$\xi = \xi(\lambda) \tag{9}$$

Here, $\xi(\lambda)$ is a function of the wavelength. For example, a possible choice for this function is $$\xi_i = \kappa\left(\frac{\lambda_i}{\lambda_r} - 1\right) \tag{10}$$

The constant of proportionality k has units of length and is determined by the strength of the dispersion of the dispersive element, that is to say in particular by the grating constant of the utilized grating 43.

Hence, the displacement path is represented as follows:

$$d_{i,j} = \begin{pmatrix} d_{i,j}^x \\ d_{i,j}^y \end{pmatrix} = \begin{pmatrix} 2s_{i,j}^x + \xi_i \\ d_{i,j}^y \end{pmatrix} \quad (11)$$

In this example, the dispersion therefore only affects the x-direction. In FIG. 12, the displacement vector for the plotted pixel (12, 5) would therefore not be changed by the dispersion, while the displacement vector for the plotted pixel (8, 4) would have a dispersive component.

Then, the following is obtained for the centroid of the effective PSF:

$$s_{i,j} = \begin{pmatrix} \frac{d_{i,j}^x - \xi_i}{2} \\ \frac{s_{i,j}^y}{2} \end{pmatrix} \quad (12)$$

Thus, there is no change in the direction perpendicular to the dispersion, in a manner comparable to a conventional image scanning (airy scanning) evaluation, while there is stretching/compression in the direction of the dispersion. This is implemented in such a way that the components whose wavelengths are further away from the reference wavelength are corrected more, with the result that the centroid of the effective PSF is then displaced closer in the direction of the reference pixel. The centroids are then no longer at half the displacement length between the pixels and the reference pixel, but are displaced somewhat closer to the reference pixel. This therefore provides a rule as to how the components of the pixels must be displaced in order to ultimately be able to combine the contributions of all pixels by calculation. Optionally, further calibrations may also be used here in order to determine the correct $s_{i,j}$. However, what may occur, especially in the case of thick samples which are often examined using multi-photon microscopy, is that the displacement vectors are influenced by sample-induced aberrations (Castello et al. 2019; FIG. 1c). An option for determining these push-back vectors only from the image data of the individual pixels of the sensor is given in the next section.

Determination of the Displacement Vectors by Way of a Phase Correlation

Another possibility of data evaluation for the case under consideration is based on the assumption that the wavelengths of a band associated with a dye, which are evaluated here, are generally characterized by a very specific spatial structure of the sample and that this structure is ultimately identical for all spectral components since, of course, this structure was marked using the corresponding dye. A second color, for example the blue-green spectrum in FIG. 11 (pixel region 71), is then distinguished by a different and distinguishable structure of the sample (e.g., the cell nucleus, which has been labeled using DAPI, for example). Hence, the assumption can be made that the images ultimately all have a largely identical structural content, even if they emit in slightly different colors. In this case, a phase correlation lends itself as another variant [Castello et al., 2019].

In this case, the pixels of the scanned image are initially numbered and labeled according to $n=(n_x, n_y)$. In this way, the image that consists of $N_x \times N_y$ image points is denoted $g_{i,j}(n)$, with $n_x=1 \ldots N_x$ and $n_y=1 \ldots N_y$. Furthermore, the so-called correlogram (related to a reference pixel (3, 3) in this case) is defined as:

$$r_{i,j} = FFT^{-1}\left(\frac{FFT(g_{i,j})FFT(g_{3,3})^*}{|FFT(g_{i,j})FFT(g_{3,3})^*|}\right)$$

FFT and $FFT^{-1}$ in this case denote, in a manner known per se, the (fast) Fourier transform and its inverse, respectively. The maximum of this correlogram $$(s_{i,j}^x, s_{i,j}^y) = \arg\max_{(n_x, n_y)} (r_{i,j}(n)) \quad (14)$$

then supplies the respective displacement vector, by which the image content must be pushed back.

The scope of this method is likewise discussed in [Castello et al., 2019]. Ultimately, this procedure is similar to what is known as a registration of the images which supply the various pixels. An advantage of this evaluation is that the dispersion, in principle, does not even have to be known and different functional curves of the dispersion can also be treated using the algorithm. Moreover, the method is less dependent on aberrations in the image on the sensor. However, the computational outlay is higher.

In principle, further methods known from image scanning can also be used for the present invention. Reference is again made to [Castello et al., 2019]. What is known as a multi-view deconvolution for the data evaluation is also discussed there, and this can also be used in the present invention. Furthermore, it is possible to resort to the published literature on the Zeiss Airyscan.

Thus, this specifies another way of how the data of the confocal spectral sensor can be evaluated with spatial oversampling of the PSF in order to simultaneously determine the better resolved images with increased SNR and at the same time ascertain the spectrum.

As described above, the spectrum itself can always be obtained by summing the pixels in a column, that is to say perpendicular to the dispersion direction (direction j in FIG. 3 above).

Application to Multi-Color Excitations

The method according to the invention can also be applied very advantageously to the simultaneous detection of a plurality of dyes. To this end, it is advantageous that the integration limits, especially in the dispersion direction 41, can be defined flexibly. In this case, integration limits mean the limits within which the individual spectral contributions of the point spread function must be summed for a specific dye. This allows, for example, the extent of the point spread function to be calibrated separately for each dye. This is explained in more detail in connection with FIG. 9.

FIG. 9a) shows a sum of 1000 simulated recordings of the SPAD camera 50 when exposed to two dyes, each with a photon flux of 10 MHz and an exposure duration of 1 µs for the individual images. FIG. 9b) shows the entire spectrum determined from the image data. FIG. 9c) shows partial spectra obtained when the integration bandwidth is restricted. Finally, FIG. 9d) shows the point spread function determined in the partial regions shown in FIG. 9c).

Automation Options

The calibration of the system always only applies strictly to a fixed preset experiment, as it depends on the chosen objective and the examined dyes, in particular. Following a modification of the experiment, it is therefore advantageous to let the system relearn the calibration by evaluating the averaged image data according to FIG. 8 and FIG. 9 and writing the calibration data to the memory of the evaluation electronics 60, for example.

A continuous renewal of the calibration data from the last (few) LSM image scans is moreover advantageous. This allows the system to react independently to changes in the experimental surroundings.

A further advantageous aspect lies in the option of automatically setting the spectral channels by defining the integration limits. This is rendered possible by the high-resolution sampling of the spectral space at increments of 1 nm or even finer. By way of example, an algorithm for finding maxima and minima can use the integrated signal from FIG. 9b) to determine a proposal for defining integration limits or, equivalently, spectral channels. Thus, the system can also efficiently detect the emission from unknown samples and preset an advantageous dye separation. Optionally, columns in the y-direction of the matrix sensor 50 on which light with the wavelength of the excitation light 14 is incident might not be evaluated or might be deactivated.

LIST OF REFERENCE SIGNS

10 Excitation beam path
12 Light source
(12, 3) Reference pixel
14 Excitation light
16 Deflection mirror
18 Main color splitter
22 Scanning device
23 Tube lens
24 Microscope objective
26 Sample plane
27 Illumination spot
28 Emission light
29 Zeroth order diffraction
30 Detection beam path
32 Detection unit
(3, 3) Reference pixel
34 Control and evaluation unit, in particular a PC
Dispersion device
41 Dispersion direction
42 Spectral component of the emission light 28
43 Grating
44 Spectral component of the emission light 28
46 Spectral component of the emission light 28
47 Spectral component of the emission light 28
48 Imaging optical unit
50 Two-dimensional matrix sensor
51 Pixel of the matrix sensor 50
53 Size of a pixel
54 Matrix sensor
56 Image plane (=plane of the matrix sensor 50)
57 Centroid of the function $s_{5.4}$
60 Evaluation electronics
71 Pixel region of a dye
72 Pixel region of a dye
80 Circularly symmetric point spread function
100 Laser scanning microscope
200 Detection apparatus
a Grid constant of the matrix sensor 50
$d_{i,j}$ Pixel reassignment displacement vector
$d_{i,j}^{x}$-component of the displacement vector $d_{i,j}$
$d_{i,j}^{y}$ y-component of the displacement vector $d_{i,j}$ $g_{i,j}$ (n) Image at the position n
$g_{i,j}$, $g_{i,j}$ (x) Intensity value measured by the pixel i,j
$g_{i,j}$ Position vector to pixel i,j in image plane 56
$h^{em}(\lambda)$ PSF of the emission
$h^{exc}(x)$ PSF of the excitation
$h_{i,j}(x)$ Effective PSF for pixels i,j
i Column of the matrix sensor 50
(i,j) Pixel
j Row of the matrix sensor 50
m Number of rows of the matrix sensor 50
mi Minimum in the spectral distribution sp;
mx1 Maximum in the spectral distribution sp;
mx2 Maximum in the spectral distribution sp;
n Number of columns of the matrix sensor 50
n Position vector to an image point
$n_x$ x-component of the position vector n to an image point
$n_y$ y-component of the position vector n to an image point
$r_{i,j}$ Correlogram for pixel i,j
s1 Emission spectrum of a dye
s2 Emission spectrum of a dye
$s_{i,j}$ Position vector to the maximum of the effective PSF $h_{i,j}(x)$
$sp(\lambda)$ Spectral distribution (continuous)
$sp_i$ Spectral distribution (discrete)
x Location in the image plane 56 projected back into the sample plane
x Coordinate direction of matrix sensor 50 (=dispersion direction)
y Coordinate direction of matrix sensor 50 (perpendicular to dispersion direction)
Airy(x,$\lambda$) Airy function
$I^{cal}_i$ Spatial intensity distribution
$I_{i,j}$ Intensity value measured by the pixel i,j
$N_x$ Number of image points in x-direction
$N_y$ Number of image points in y-direction
FFT Fast Fourier Transform
$FFT^{-1}$ Inverse Fast Fourier Transform
Pi-n,j Overlap data relating to a spatial overlap on the matrix sensor 50 of spectral components of a point spread function of a dye that are displaced in the dispersion direction 41
PSF point spread function (Point Spread Function)
S Sample
SNR Signal-to-noise ratio
$\lambda(\lambda)$, $\xi_i(\xi)$ Wavelength-dependent component of displacement vector $d_{i,j}$
$\delta\lambda$ Spectral bandwidth of a dye
$\lambda$ Wavelength
$\lambda_i$ Wavelength at the column i of the matrix sensor 50
$\lambda_r$ Wavelength at the location or column of a reference pixel
k Constant for modeling the dispersion for displacement vector $d_{i,j}$

The invention claimed is:

1. A method for detecting emission light in a laser scanning microscope, in which emission light coming from a sample is guided by way of an imaging optical unit to a two-dimensional matrix sensor that is situated in an image plane and has a multiplicity of pixels, the method comprising:
    detecting a detection point spread function, wherein the detecting includes spatially oversampling the detection point spread function using the matrix sensor,
    spectrally separating the emission light coming from the sample using a dispersion device,
    separately detecting the spectrally separated emission light using the matrix sensor, and evaluating intensities measured by the pixels of a pixel region of the detection point spread function, wherein the evaluating includes reversing the spectral separation for at least some of these pixels, wherein the reversing the spectral separation for the at least some pixels of a pixel region includes assigning intensity values measured by the pixels to a location in the image plane that has been displaced relative to the respective pixel, using a displacement vector depending on the location of the respective pixel and a wavelength associated with that location.

2. The method as claimed in claim 1, further comprising identifying at least one pixel region of the detection point spread function which is assigned to emission of a dye on the basis of a spectrum measured using the matrix sensor.

3. The method as claimed in claim 2,
wherein the identifying at least one pixel region includes:
determining a spectral intensity distribution of the emission light on the matrix sensor;
automatically searching for maxima and minima in the determined spectral intensity distribution; and either
proposing spectral limits for calculating the point spread function of a specific dye to a user on the basis of the maxima and minima that have been found, or
automatically defining the spectral limits on the basis of the maxima and minima that have been found.

4. The method as claimed in claim 1, further comprising determining a spectral intensity distribution of the emission light on the matrix sensor, wherein the determining includes determining an intensity value associated with a specific wavelength by virtue of the measurement data of a plurality of pixels in a column of the matrix sensor perpendicular to a dispersion direction being summed.

5. The method as claimed in claim 1,
wherein
a plurality of pixel regions overlap on the matrix detector, and the method further includes
spectral unmixing the intensities measured by the individual pixels to determine spectral weights for each of the plurality of pixel regions.

6. The method as claimed in claim 1,
wherein the evaluating includes
determining a detection point spread function for at least one fluorescent dye.

7. The method as claimed in claim 1, further comprising simultaneously guiding emission light emitted by a plurality of points on a sample that are illuminated by excitation light at the same time to the matrix sensor and evaluating the emission light.

8. The method as claimed in claim 1,
wherein
the matrix sensor is operated in a photon counting mode.

9. The method as claimed in claim 1,
wherein the reversing the spectral separation for at least some pixels of a pixel region includes
combining the intensity values measured by these pixels based on a spectral intensity distribution of the emission light for a dye associated with the pixel region and a spatial intensity distribution of individual spectral components on the matrix sensor.

10. The method as claimed in claim 9,
wherein
an intensity distribution measured by pixels of a column perpendicular to a dispersion direction is used as the spatial intensity distribution of the individual spectral components.

11. The method as claimed in claim 1, further comprising obtaining a wavelength-independent component of the displacement vector for a specific pixel by scaling a vector component of the vector from a reference pixel to the relevant pixel by a reassignment factor.

12. The method as claimed in claim 1,
wherein
a detection point spread function obtained after performing the pixel reassignment has substantially the same shape in a dispersion direction as perpendicular to the dispersion direction.

13. The method as claimed in claim 1, further comprising determining the displacement vectors associated with a wavelength range assigned to a sample structure by evaluating a phase correlation of a plurality of scanned images.

14. The method as claimed in claim 1,
wherein
time-resolved measurements for determining fluorescence lifetimes of dyes are carried out using the matrix sensor.

15. A detection apparatus for detecting emission light in a laser scanning microscope, the detection apparatus comprising:
a two-dimensional matrix sensor in an image plane with a multiplicity of pixels for spatially oversampled detection of a detection point spread function of emission light coming from a sample and comprising an imaging optical unit for guiding the emission light to the two-dimensional matrix sensor,
a dispersion device for spectrally separating the emission light, wherein the matrix sensor is configured and positioned for separately detecting the spectrally separated emission light, and
evaluation electronics connected to the matrix sensor for evaluating intensities measured by the pixels of a pixel region of the detection point spread function, wherein the evaluating includes reversing the spectral separation for at least some of these pixels,
wherein, in order to reverse the spectral separation for the at least some of the pixels of the pixel region, the evaluation electronics are configured to assign intensity values measured by the pixels to a location in the image plane that has been displaced relative to the respective pixel, using a displacement vector depending on the location of the respective pixel and a wavelength associated with that location.

16. The detection apparatus as claimed in claim 15,
wherein
in order to reverse the spectral separation for the at least some of the pixels of the pixel region, the evaluation electronics are configured to combine the intensity values measured by the pixels based on a spectral intensity distribution of the emission light for a dye associated with the pixel region and a spatial intensity distribution of individual spectral components on the matrix sensor.

17. The detection apparatus as claimed in claim 15,
wherein
the dispersion device comprises a light-diffracting and/or a light-refracting device.

18. The detection apparatus as claimed in claim 15, wherein
the matrix sensor comprises an analog integrating detector and/or a photon counting detector.

19. The detection apparatus as claimed in claim 15, wherein
a dispersion direction lies in the direction of a coordinate direction of the matrix sensor.

20. The detection apparatus as claimed in claim 15, wherein
in order to increase the detection efficiency, a microlens is arranged upstream of the matrix sensor.

21. The detection apparatus as claimed in claim 15, wherein
a diameter of an Airy disk of the detection point spread function in the plane of the matrix sensor is less than twenty times a lattice constant of the matrix sensor.

22. The detection apparatus as claimed in claim 15, wherein
a spectral bandwidth per pixel of the matrix sensor in a dispersion direction is less than 0.5 nm.

23. The detection apparatus as claimed in claim 15, wherein
the imaging optical unit comprises a zoom system.

24. The detection apparatus as claimed in claim 15, wherein
in order to determine a fluorescence lifetime of dyes, the matrix sensor and the evaluation electronics are configured to carry out time-resolved measurements.

25. A laser scanning microscope, comprising:
a light source for emitting excitation light,
an excitation beam path with a microscope objective for guiding the excitation light onto or into a sample to be examined,
a scanning device located in the excitation beam path and serving to scan at least one illumination spot over the sample,
a detection beam path for guiding emission light emitted by the sample to a detection unit,
the detection unit for detecting the emission light,
a main color splitter for separating excitation light and emission light, and
a control and evaluation unit for controlling the light source and for evaluating measurement data obtained by the detection unit,
wherein
the detection unit comprises a detection apparatus as claimed in claim 16.

26. The microscope as claimed in claim 25, wherein
the control and evaluation unit is configured to search for maxima and minima in a determined spectral distribution and to either:
propose spectral limits for calculating the point spread function of a specific dye to a user on the basis of maxima and minima that have been found or
independently define spectral limits for calculating the point spread function of a specific dye on the basis of maxima and minima that have been found.

27. The microscope as claimed in claim 25, wherein
the control and evaluation unit is configured to detect the emission light using the detection apparatus, wherein the detecting includes:
spectrally separating the emission light coming from the sample using the dispersion device,
separately detecting the spectrally separated emission light using the matrix sensor, and
evaluating intensities measured by pixels of a pixel region, the evaluating including reversing the spectral separation for at least some of these pixels.

28. A method for detecting emission light in a laser scanning microscope, in which emission light coming from a sample is guided by way of an imaging optical unit to a two-dimensional matrix sensor that is situated in an image plane and has a multiplicity of pixels, the method comprising:
detecting a detection point spread function, wherein the detecting includes spatially oversampling the detection point spread function using the matrix sensor,
spectrally separating the emission light coming from the sample using a dispersion device,
separately detecting the spectrally separated emission light using the matrix sensor, and
evaluating intensities measured by the pixels of a pixel region of the detection point spread function,
wherein the evaluating includes reversing the spectral separation for at least some of these pixels, and
wherein the reversing the spectral separation for the at least some pixels of the pixel region includes combining the intensity values measured by these pixels, based on a spectral intensity distribution of the emission light for a dye associated with the pixel region and a spatial intensity distribution of individual spectral components on the matrix sensor.

29. A detection apparatus for detecting emission light in a laser scanning microscope, the detection apparatus comprising:
a two-dimensional matrix sensor in an image plane with a multiplicity of pixels for spatially oversampled detection of a detection point spread function of emission light coming from a sample and comprising an imaging optical unit for guiding the emission light to the two-dimensional matrix sensor,
a dispersion device for spectrally separating the emission light,
wherein the matrix sensor is configured and positioned for separately detecting the spectrally separated emission light, and
evaluation electronics connected to the matrix sensor for evaluating intensities measured by the pixels of a pixel region of the detection point spread function, wherein the evaluating includes reversing the spectral separation for at least some of these pixels, and
wherein, in order to reverse the spectral separation, the evaluation electronics are configured to combine the intensity values measured by the at least some of the pixels of the pixel region, based on a spectral intensity distribution of the emission light for a dye associated with the pixel region and a spatial intensity distribution of individual spectral components on the matrix sensor.

* * * * *

UNITED STATES PATENT AND TRADEMARK OFFICE
CERTIFICATE OF CORRECTION

PATENT NO. : 11,921,274 B2
APPLICATION NO. : 18/018331
DATED : March 5, 2024
INVENTOR(S) : Daniel Schwedt, Tiemo Anhut and Peter Schacht It is certified that error appears in the above-identified patent and that said Letters Patent is hereby corrected as shown below:

In the Specification

Column 2, Line 20, "(from 2D to 1 D)" should read "(from 2D to 1D)".

Column 11, Line 33, "land j" should read "i and j".

Column 13, Line 50, "sp:" should read "$sp_i$".

Column 13, Line 67, "sp:" should read "$sp_i$".

Column 16, Line 31, "d is an" should read "$d_{i,j}$ is an".

Column 18, Line 37, "direction I" should read "direction i.".

Column 20, Line 2, "ny=1" should read "$n_y=1$".

Column 22, Line 4, "hem(λ)" should read "hem(x)".

Column 22, Line 11, "sp;" should read "$sp_i$".

Column 22, Line 12, "sp;" should read "$sp_i$".

Column 22, Line 13, "sp;" should read "$sp_i$".

Column 22, Line 45, "λ(λ), ξ(ξ)" should read "ξ(λ), $ξ_i(λ)$".

Signed and Sealed this
Twenty-first Day of May, 2024

*Katherine Kelly Vidal*

Katherine Kelly Vidal
*Director of the United States Patent and Trademark Office*